United States Patent
Zheng et al.

(10) Patent No.: US 9,880,727 B2
(45) Date of Patent: Jan. 30, 2018

(54) GESTURE MANIPULATIONS FOR CONFIGURING SYSTEM SETTINGS

(71) Applicant: Microsoft Technology Licensing, LLC, Redmond, WA (US)

(72) Inventors: Qixing Zheng, Bellevue, WA (US); Thomas Scott Coon, Kirkland, WA (US); Jason Morris Yore, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 381 days.

(21) Appl. No.: 14/033,226

(22) Filed: Sep. 20, 2013

(65) Prior Publication Data
US 2014/0359435 A1 Dec. 4, 2014

Related U.S. Application Data

(60) Provisional application No. 61/828,565, filed on May 29, 2013.

(51) Int. Cl.
| | | |
|---|---|---|
| *G06F 3/048* | (2013.01) | |
| *G06F 3/0488* | (2013.01) | |
| *G06F 3/01* | (2006.01) | |
| *G06F 3/0481* | (2013.01) | |
| *G06F 3/0484* | (2013.01) | |
| *G06F 3/0486* | (2013.01) | |
| *G09G 5/00* | (2006.01) | |

(52) U.S. Cl.
CPC ............ *G06F 3/0488* (2013.01); *G06F 3/016* (2013.01); *G06F 3/0486* (2013.01); *G06F 3/04817* (2013.01); *G06F 3/04845* (2013.01); *G09G 5/003* (2013.01); *G09G 2320/08* (2013.01)

(58) Field of Classification Search
CPC combination set(s) only.
See application file for complete search history.

(56) References Cited

U.S. PATENT DOCUMENTS 5,923,307 A * 7/1999 Hogle, IV ........... G06F 3/04897
345/1.3
8,086,967 B2 * 12/2011 Windl ................... G06F 9/4443
715/788

(Continued)

FOREIGN PATENT DOCUMENTS

WO 2011/088611 A1 7/2011

OTHER PUBLICATIONS

"International Search Report & Written Opinion for PCT Patent Application No. PCT/US2013/061089", dated Dec. 9, 2013, Filed Date: Sep. 21, 2013, 13 Pages.

(Continued)

*Primary Examiner* — Hien Duong
(74) *Attorney, Agent, or Firm* — Arent Fox LLP

(57) ABSTRACT

In some examples, a gesture configuration component provides for different ways to interpret gestures made by a user to specify various parameters of control settings to modify system or application settings. For instance, a user may change display settings for one or more display devices, such as resolution, orientation, and display arrangements. Further, in some cases, the gesture configuration component may perform configuration changes while providing a live preview of the changes being made.

20 Claims, 19 Drawing Sheets

(56) References Cited

U.S. PATENT DOCUMENTS

| | | | | |
|---|---|---|---|---|
| 8,508,431 | B2* | 8/2013 | Kim | G06F 3/1446 345/1.1 |
| 8,554,897 | B2* | 10/2013 | Kim | H04L 12/2812 709/223 |
| 8,564,555 | B2* | 10/2013 | Day | 178/18.01 |
| 8,791,876 | B2* | 7/2014 | Choi | G09G 5/363 345/1.3 |
| 8,799,425 | B2* | 8/2014 | Lonkar | G06F 3/1438 709/221 |
| 8,954,872 | B2* | 2/2015 | Orr | G06F 3/0482 345/1.3 |
| 2003/0189597 | A1* | 10/2003 | Anderson | G06F 3/0481 715/778 |
| 2005/0007397 | A1 | 1/2005 | Hatori et al. | |
| 2006/0048062 | A1* | 3/2006 | Adamson | G09G 5/363 715/760 |
| 2006/0161847 | A1* | 7/2006 | Holecek | G06F 3/0481 715/716 |
| 2009/0024945 | A1 | 1/2009 | Balassanian | |
| 2009/0288011 | A1* | 11/2009 | Piran | G08B 13/19693 715/720 |
| 2010/0138780 | A1* | 6/2010 | Marano | G06F 3/1415 715/804 |
| 2010/0299436 | A1* | 11/2010 | Khalid | G06F 1/1643 709/226 |
| 2011/0138314 | A1* | 6/2011 | Mir | G06F 9/4445 715/779 |
| 2011/0145759 | A1* | 6/2011 | Leffert | G06F 3/04845 715/800 |
| 2011/0185317 | A1* | 7/2011 | Thimbleby | G06F 3/04845 715/863 |
| 2011/0246904 | A1* | 10/2011 | Pinto | G06F 9/4445 715/740 |
| 2012/0179969 | A1* | 7/2012 | Lee | G06F 1/1626 715/719 |
| 2012/0185790 | A1* | 7/2012 | Bae | G06F 3/0488 715/769 |
| 2012/0226977 | A1 | 9/2012 | Lengeling et al. | |
| 2012/0262494 | A1* | 10/2012 | Choi | G06F 3/0481 345/672 |
| 2013/0268877 | A1* | 10/2013 | Han | G06F 3/04842 715/769 |
| 2014/0223490 | A1* | 8/2014 | Pan | H04N 21/42224 725/61 |
| 2014/0324962 | A1* | 10/2014 | Lewin | H04L 67/141 709/204 |

OTHER PUBLICATIONS

Chiappetta, Marco, "How to Set Up Multiple Monitors in Windows 8", PCWorld Article, Jul. 29, 2012, 4 Pages.

Villamor, et al., "Touch Gesture, Reference Guide", Published on: Apr. 15, 2010, Available at: http://static.lukew.com/TouchGestureGuide.pdf.

Artinger, et al., "Beyond Pinch-to-Zoom: Exploring Alternative Multi-Touch Gestures for Map Interaction", Published on: Oct. 2010, Available at: https://mediatum.ub.tum.de/doc/1094490/1094490.pdf., 13 pages.

Hinckley, et al., "Sensor Synaesthesia: Touch in Motion, and Motion in Touch", In Proceedings of the SIGCHI Conference on Human Factors in Computing Systems, May 7, 2011, 10 pages.

Malik, et al., "Interacting with Large Displays from a Distance with Vision-Tracked Multi-Finger Gestural Input", In Proceedings of the 18th Annual ACM Symposium on User Interface Software and Technology, Oct. 23, 2005, 10 pages.

Malik, et al., "Visual Touchpad: A Two-handed Gestural Input Device", In Proceedings of the 6th International Conference on Multimodal Interfaces, Oct. 13, 2004, 8 pages.

"Touch & type", Retrieved Date: May 28, 2013, Available at: http://support.google.com/android/bin/answer.py?hl=en-GB&answer=1637532, 2 pages.

Wang, et al., "Detecting and Leveraging Finger Orientation for Interaction with Direct-Touch Surfaces", In Proceedings of the 22nd Annual ACM Symposium on User Interface Software and Technology, Oct. 4, 2009, 10 pages.

* cited by examiner

GESTURE MANIPULATIONS FOR CONFIGURING SYSTEM SETTINGS

PRIORITY CLAIM AND CROSS-REFERENCE TO RELATED APPLICATION

This application claims the benefit of, and priority to, U.S. Provisional Patent Application No. 61/828,565, filed May 29, 2013, which is incorporated by reference herein in its entirety.

BACKGROUND

Most user operating systems allow users to reconfigure their operating environment by allowing access and modifications to various system settings. In some cases, a display application may enable a user to reconfigure resolutions or rearrange content shown on one or more display devices. However, traditionally, in order for a user to make a change to any given control setting, the user must provide input through typical input devices, such as a mouse and keyboard.

SUMMARY

The techniques and systems described herein present various implementations of a gesture configuration component which provides for different ways to interpret gestures to specify various parameters within one or more control settings for a user to modify system or application settings. For example, a user may change display settings for one or more display devices, such as resolution, orientation, and display arrangements. In other examples, a user may change audio settings for a sound-related control setting, or other control settings. Further, in some implementations related to displays, the gesture configuration component may perform configuration changes while providing a live preview of the changes being made.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

The techniques and systems described herein are directed to implementations of a gesture configuration component that provides for specifying parameters for various control settings based at least partly on gesture input. In some implementations, a gesture configuration component may provide for different ways to interpret gestures to specify parameters within control settings for a user to modify system or application settings. For example, a user may change display settings for one or more display devices. The display settings may include resolution, orientation, and display arrangements.

In some implementations, the gesture configuration component may perform configuration changes while providing a live preview of the changes being made. In other implementations, the live preview functionality may be implemented in accordance with traditional control setting specifications. Thus, the live preview ability may be provided independent from the recognition of gestures by the gesture recognition component.

The gesture configuration component may allow for a touch-based approach to change control settings, such as changing display settings. However, touch-based gestures applied to touch-sensitive devices are simply one possible method of interpreting a gesture. Other types of gestures may be recognized, for example, visually through camera input, or through a combination of visual and touch gestures. In some implementations, a gesture may be detected through a camera directed at a user's hand, where the gesture is performed without contact on the screen of the computing device. In other implementations, voice commands may serve as equivalent to a gesture, for example, a command such as "drag the thumbnail display on the right to the left." In this way, voice commands may be specified to correspond to each type of gesture input.

Example Implementations

Figure 1:
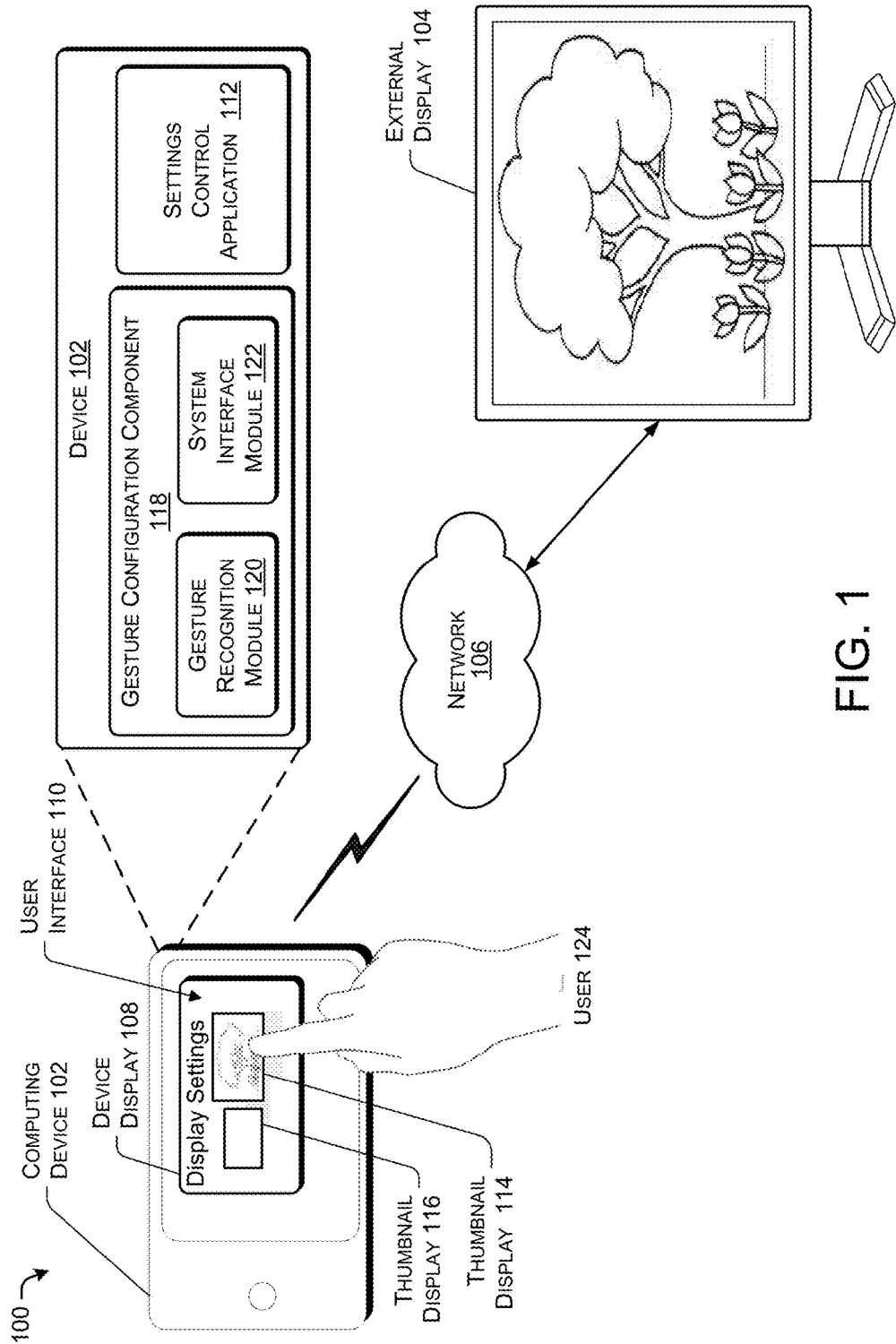
FIG. 1 illustrates an example environment for implementing a gesture configuration component, including a user using a mobile computing device and a display device according to some implementations.

FIG. 1 illustrates a computing environment 100 depicting a computing device 102, which may be connected to one or more external displays, such as external display 104, over a network 106. In some cases, the device 102 may include one or more displays, such as device display 108. In an implementation, the device display 108 may include a touch-sensitive display device. In this example, the computing device 102 and the external display device 104 may be connected wirelessly, for example over a wireless network or direct via wireless communication. In other examples, the computing device 102 and the external display 104 may be connected directly with a cable compatible with both the computing device 102 and the external display 104. The computing device 102 may include any computing device that includes a touch sensitive display device. For example, the computing device 102 may include a tablet computing device, a mobile phone, a smart phone, a laptop computing device, a gaming device, a wearable computing device, combinations thereof, and the like.

The device display 108 may display content of one or more applications, such as a user interface 110 associated with a settings control application 112. The settings control application 112 may cause the content of one or more available display devices to be shown in the user interface 110 as thumbnail displays. In the illustrative example of FIG. 1, a first thumbnail display 114 may include content of the device display 108 and a second thumbnail display 116 may include content of the external display 104.

In an implementation, the computing device 102 may be configured to implement a gesture configuration component 118, which may include a gesture recognition module 120 and a system interface module 122. The gesture configuration component 118 may be implemented within hardware, software, or a combination of both. In this example, the gesture recognition module 120 may be configured to recognize touch input, voice input, visual input, or some combination of touch input, voice input, and visual input. Further in this example, the system interface module 122 may be configured to interact with an operating system of the device 102 or to interact with one or more hardware elements of the device 102.

In various implementations, within the device display 108, a user 124 may perform different gestures via the user interface 110 of the settings control application 112 to produce different configuration changes on the device display 108. In some cases, the user 124 may perform gestures via the user interface 110 to produce configuration changes on multiple displays, through gestures directed at content of the user interface 110. Further, in some implementations, the user interface 110 may not include visible control settings icons or elements that may be selectable by the user 124 to perform specified functions. Rather, the functions associated with the control settings may be performed in response to particular gestures made by the user 124. For example, the user interface 110 may not display a button or menu option that is selectable to perform an operation that may be performed using a gesture, as described herein. Instead, the gesture replaces a button or icon that may be selected to perform an operation. Furthermore, control settings may be configured without manipulating a representation showing the magnitude of the control setting, such as a scale showing volume of an audio device, a scale showing resolutions of display devices, or a scale showing colors for various color settings. In this way, the user interface 110 may be much "cleaner" or more visually appealing because the user interface 110 lacks the clutter of buttons or menu options that may be selected through a mouse or other traditional input.

In some implementations, a user may tap over a region proximate to a thumbnail display, and in response, the thumbnail display may change state from selected to unselected or unselected to selected. If the thumbnail display has changed to a selected state, the user 124 may perform different gestures, such as the gestures described below. The gesture configuration component 118 may then recognize the gesture as being applied to the display device corresponding to the selected thumbnail display.

Figure 2:
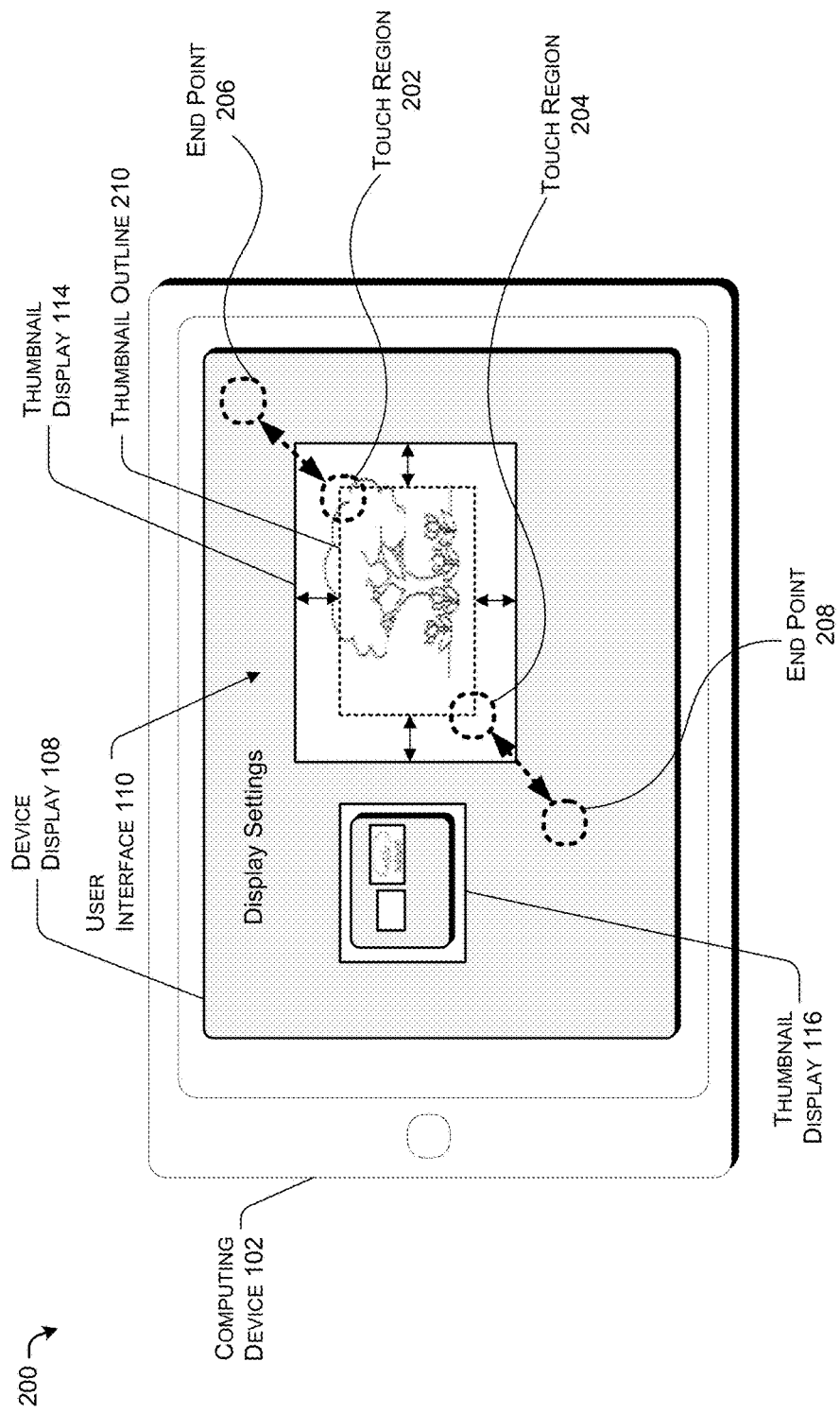
FIG. 2 illustrates a first example gesture for modifying a system setting according to some implementations.

FIG. 2 illustrates a framework 200 depicting the computing device 102, including example touch regions corresponding to a gesture. As illustrated in FIG. 2, within the user interface 110 shown on the device display 108, a user may touch two points or regions proximate to the first thumbnail display 114, such as first touch region 202 and second touch region 204. The first thumbnail display 114 may include a representation of an external display, such as the external display 116 of FIG. 1. After the user touches the first touch region 202 and the second touch region 204, the user may move or drag the two touch regions 202, 204 farther apart, as depicted with the arrow directions shown in FIG. 2 that are associated with the touch regions 202, 204. In this example, as a result of the gesture applied to first thumbnail display 114, the display resolution for the external display 104 is changed in relation to the gesture. In this example, the resolution is increased by an amount that is proportional to parameters of the gesture. For example, the resolution may be increased based on a number of pixels between the first touch region 202 where the gesture started and the point on the user interface 110 where the gesture ended, a first end point 206, and a number of pixels between the second touch region 204 and a second end point 208.

In the illustrative implementation of FIG. 2, the original size of the first thumbnail display 114 may be represented by thumbnail outline 210. The expansion of the thumbnail outline 210 to the size of the first thumbnail display 114 may occur in response to a user performing a gesture starting at touch regions 202 and 204 and ending at endpoints 206, 208.

Similarly, if a user touches two points proximate to the first thumbnail display 114, and moves or drags the two points closer together, the result of the gesture may be to decrease the resolution of the corresponding display device. For example, if a gesture begins with a user touching touch the regions 202 and 204, and drags the touch points closer together, a component of the computing device 102, such as the gesture configuration component 118 of FIG. 1, may quantify the dragging distance and generate a command to decrease the resolution of the display device corresponding to the first thumbnail display 114 (i.e., the external display 104 of FIG. 1). In different implementations, a quantification of a gesture may be in pixels or in units of measurement, such as millimeters, centimeters, inches, and the like. In another example, the first thumbnail display 114 may be reduced in size to that of the thumbnail outline 210 by a user performing a gesture starting at the endpoints 206, 208 and ending at the touch regions 202, 204.

Further, in some implementations, if a user performs a decrease resolution gesture, and maintains the decrease resolution gesture, then once the resolution of the display device reaches a minimum threshold, a next thumbnail display may be automatically selected. As the decrease resolution gesture is maintained, a decrease resolution operation may be applied to decrease the resolution of the display screen corresponding to the additional thumbnail display that has been selected. A continuing decrease resolution gesture may be maintained or continued if a user substantially continuously touches two points on the touch-sensitive display and after performing the decrease resolution gesture. In general, once a gesture causes the gesture configuration component 118 to modify a system setting to a minimum amount, if the gesture is maintained, such as for a threshold period of time, then the gesture configuration component 118 may automatically select a next item that may be modified according to the same system setting.

In this manner, in some implementations, an increase resolution gesture that is applied to a particular thumbnail display and maintained for a threshold period of time may ultimately result in the thumbnail display reaching a maximum resolution, and continuing to maintain the increase resolution gesture may cause the resolution of one or more additional thumbnail displays to be increased depending on the amount of time that the increase resolution gesture is maintained. In this example, after the display associated with the first thumbnail display 114 reaches a maximum resolution, a next thumbnail display, such as the second thumbnail display 116, may be selected automatically, without an explicit or direct user selection of the second thumbnail display 116, and the resolution of the display associated with the second thumbnail display 116 may be increased.

In some implementations, the gesture configuration component 118 of FIG. 1 may specify a magnitude of a gesture to correspond with a magnitude of change of a display setting. For example, the gesture configuration component 118 may utilize a scale that correlates magnitudes of a gesture with corresponding changes in a display setting. To illustrate, a first change in distance between touch points (e.g., 1.5-1.99 mm) may correspond to a first change in resolution of a display and a second change in distance between touch points (e.g., 2.0-2.49 mm) may correspond to a second change in resolution of a display. Thus, an outward motion of the two touch regions 202 and 204 beyond a particular threshold may produce an increase from a current resolution setting to a next, pre-defined resolution setting.

In some implementations, a user may select more than one thumbnail display at a time, and in such a case, a resolution modification gesture may be interpreted by the gesture configuration component 118 of FIG. 1 as being applied to each display device corresponding to the selected thumbnail displays. In such an example, for an increase in resolution, a respective size of a number of selected displays may be increased to a next pre-defined resolution setting simultaneously. Similarly, for a decrease in resolution, a respective resolution of a number of selected display devices may be decreased to a next pre-defined resolution setting simultaneously. In an implementation, the gesture to modify the control setting may be performed proximate to one or more of the selected thumbnails. In general, for any other defined gesture, the performing of a gesture may be applied simultaneously for multiply selected thumbnail displays. In other examples, additional gestures may be similarly applied for multiply selected thumbnail displays for other system settings.

Further, in some implementations, the size of the first thumbnail display 114 may increase or decrease to reflect a change in resolution for the display device represented by the first thumbnail display 114. In this example, as depicted in FIG. 2, thumbnail outline 210 represents the size of the first thumbnail display 114 prior to the expansion of the resolution to the first thumbnail display 114. In some implementations, a magnitude of a gesture is not proportional to a modification. In this example, the gesture magnitude may correspond to the distance between touch region 202 and end point 206, however, the increase in display resolution goes from a resolution corresponding to thumbnail outline 210 to that of the first thumbnail display 114. In other words, the size of the first thumbnail display 114 did not increase in direct proportion to the amount of movement for the gesture. In other cases, the change in the resolution may be directly proportional to a magnitude of the gesture, or the change in the resolution may be specified to correspond to some other function.

Figure 3:
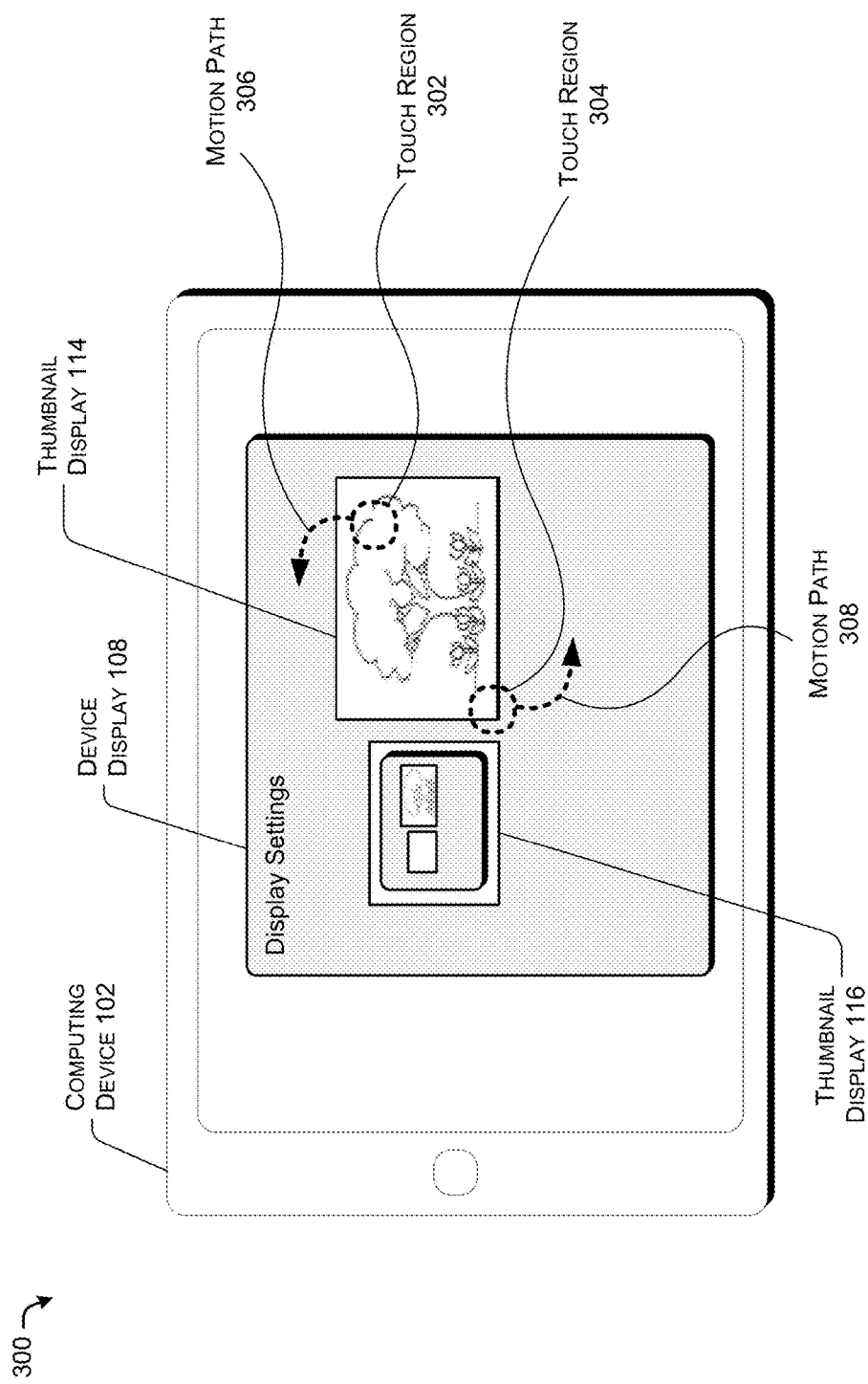
FIG. 3 illustrates a second example gesture for modifying a system setting according to some implementations.

FIG. 3 illustrates a framework 300 depicting computing device 102, including example touch regions corresponding to a gesture. In a similar manner as discussed with respect to the resolution modification gestures in FIG. 2, a user may apply a gesture to a thumbnail display to reorient the content of the corresponding display device from a landscape orientation to a portrait orientation, or from a portrait orientation to a landscape orientation. As depicted in FIG. 3, the first thumbnail display 114 represents the orientation of a corresponding display device, such as the external display 104 of FIG. 1, as currently being in a landscape orientation. In this example, if a user touches within touch regions 302 and 304 and performs a turning gesture where the touch regions 302, 304 move along the motion paths 306 and 308, the gesture configuration component 118 of FIG. 1 may change the orientation of the content shown on the external display 104 from a landscape orientation to a portrait orientation.

Figure 4:
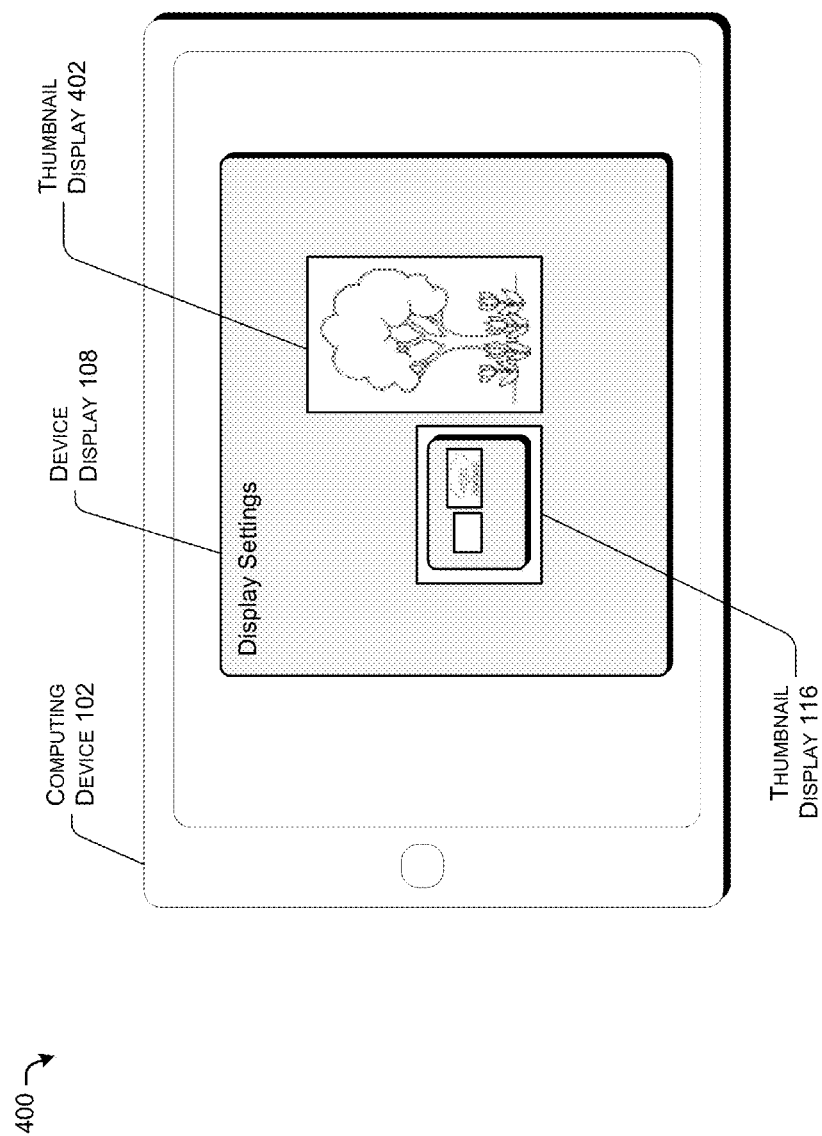
FIG. 4 illustrates an example of a change in display mode according to some implementations.

FIG. 4 illustrates a framework 400 depicting the computing device 102, including a depiction of a thumbnail display 402 in a portrait orientation as a response to a reorientation or rotate gesture with respect to the first thumbnail display 114 described above with respect to FIG. 3. In this example, in response to the rotate gesture, the gesture configuration component 118 of FIG. 1 changes a display system setting of a particular display, such as the external display 104 of FIG. 1. In other implementations, different gestures may be defined to perform a portrait-to-landscape or landscape-to-portrait operation, including combinations of gestures. For example, referring back to FIG. 3, a user may touch a single point, for example, a point within touch region 302, and then drag the touch point along motion path 306. In other examples, if a thumbnail display is selected, as indicated, for example, with a highlighted border, then a gesture may be applied to any portion of the device display 108 and the changes associated with the gesture may then be applied to the selected thumbnail display.

In some implementations, a user may select more than one thumbnail display, and in such a case, a re-orient gesture may be interpreted by the gesture configuration component 118 of FIG. 1 as being applied to each selected display device corresponding to the selected thumbnail displays. In such an example, the orientation of each selected display device may toggle, either from portrait to landscape mode, or from landscape to portrait mode simultaneously. In other implementations, if multiple thumbnail displays are selected, and the multiple thumbnail displays include both portrait and landscape orientations, a user may orient them all to a portrait mode or all to a landscape mode. For example, if the multiple thumbnail displays are selected, where there are both landscape and portrait orientations, if a user performs a gesture corresponding to a portrait mode, then each of the selected modes may be changed to portrait mode, or remain in portrait mode if already in portrait mode. To illustrate, when multiple thumbnail displays are selected, a user may touch down on the display and draw the path of a "P", or some other specified path, or some other specified gesture, and in response, each of the multiply selected thumbnail displays may be changed to portrait mode, or remain in portrait mode if already in portrait mode.

Figure 5:
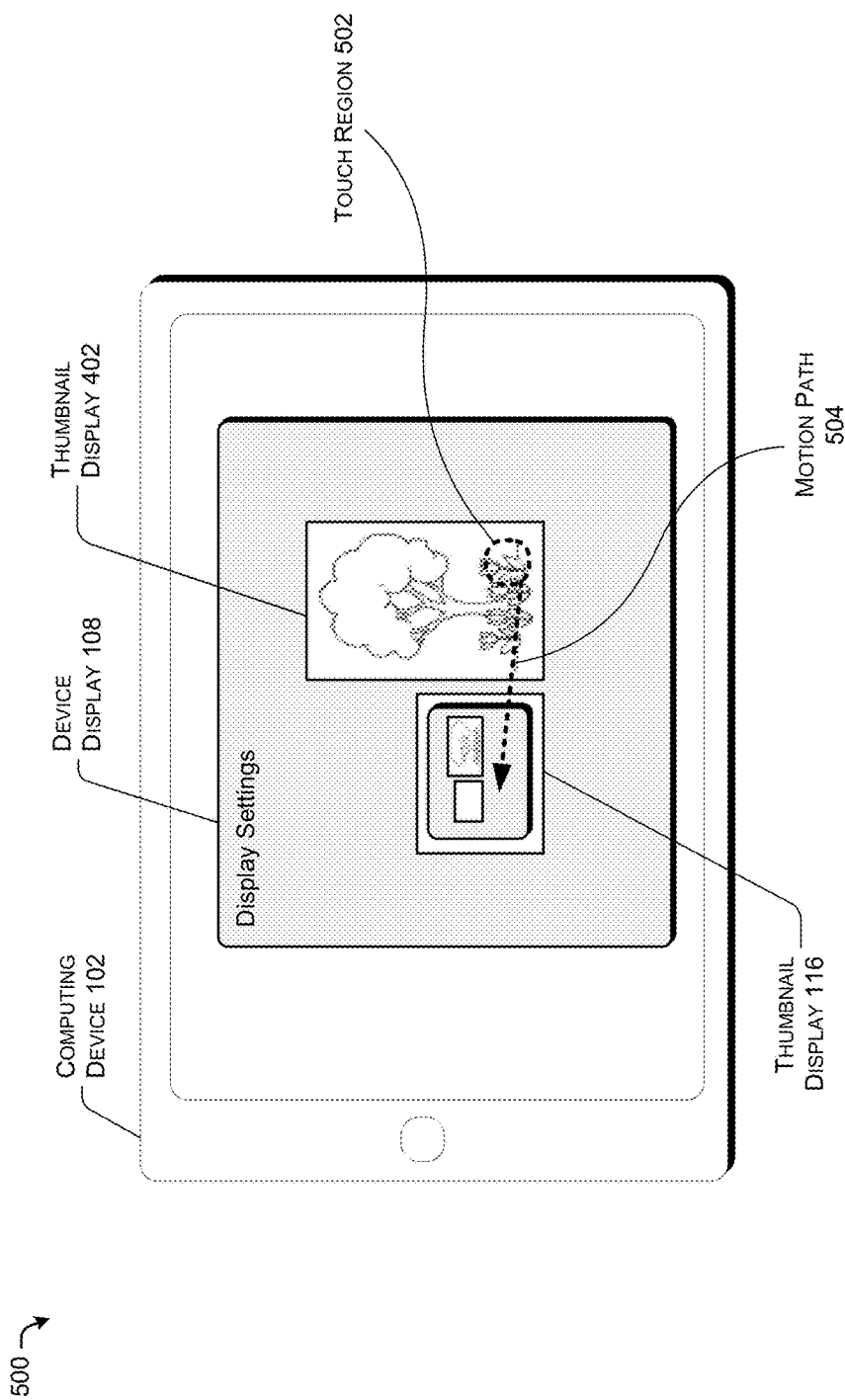
FIG. 5 illustrates a third example gesture for modifying a system setting according to some implementations.

FIG. 5 illustrates a framework 500 depicting the computing device 102, including a depiction of thumbnail displays prior to detecting and applying a move or drag gesture. In some implementations, the gesture configuration component 118 of FIG. 1 may interpret gesture input to rearrange one or more thumbnail displays. For example, a user may initiate a gesture by touching a point within touch region 502, which may be anywhere proximate to the thumbnail display 402, and drag the thumbnail display 402 in the direction of thumbnail display 116 along a motion path 504. In response to the gesture, the gesture configuration component 118 of FIG. 1 may display a live preview of content displayed within the external display 104 as the gesture is ongoing. In other words, the user is presented with an animated display showing the contents of the display device associated with the thumbnail display 402 moving as the gesture is occurring. Further, in this example, as the user drags the thumbnail display 402 in the direction of the thumbnail display 116, the gesture configuration component 118 of FIG. 1 may automatically "bump" or move the thumbnail display 116 to make room for a new position for the thumbnail display 402. Once the gesture to move or drag the thumbnail 402 is complete, the gesture configuration component 118 of FIG. 1 may indicate the new location of the thumbnail display 402 on a portion of the device display 108 at or near where the gesture stops. As discussed above, in general, if a thumbnail display is selected, then a gesture applied anywhere within the device display 108 may be interpreted as a gesture to be applied to a selected thumbnail display or selected thumbnail displays.

Figure 6:
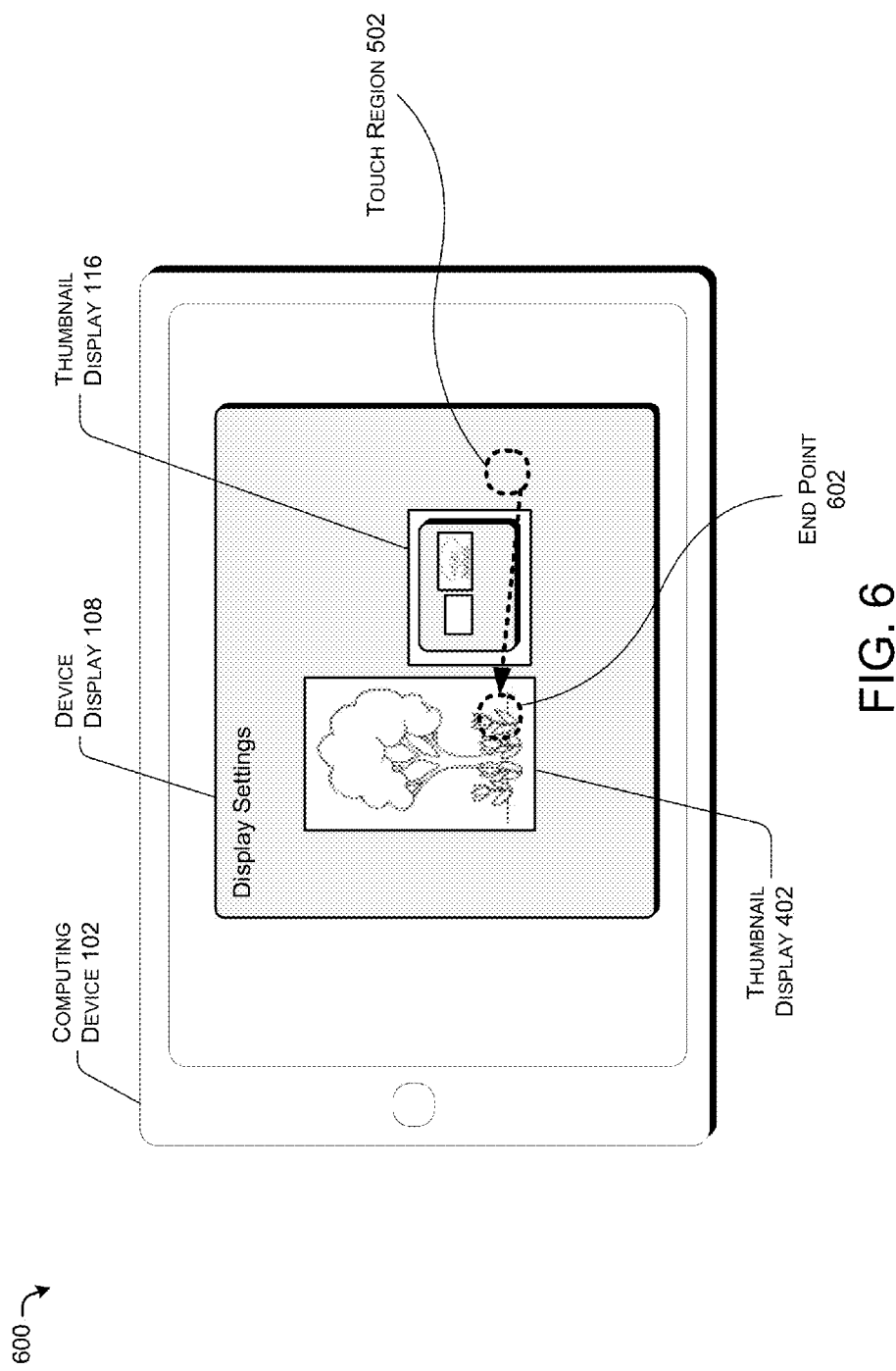
FIG. 6 illustrates a continuation of the third example gesture for modifying a system setting according to some implementations.

FIG. 6 illustrates a framework 600 depicting the computing device 102, including a depiction of the thumbnail display 402 in a new position as a response to the move gesture described above in FIG. 5. Further in this example, in addition to the thumbnail display 402 being moved to a new position, the thumbnail display 116 is also in a new position in response to being "bumped" out of place when the thumbnail display 402 was moved. In this example, at the end point of the move gesture, end point 602, the thumbnail displays 116, 402 may be displayed in the new arrangement. In this example, the beginning of the move gesture was detected when the user touched down in a point within the touch region 502, and the end of the gesture occurs when the user ends the move gesture at the end point 602. In this way, in this example, the thumbnail displays 116, 402 associated with a primary display device and a secondary display device may be interchanged within a user interface of a control application in response to gesture input.

Figure 7:
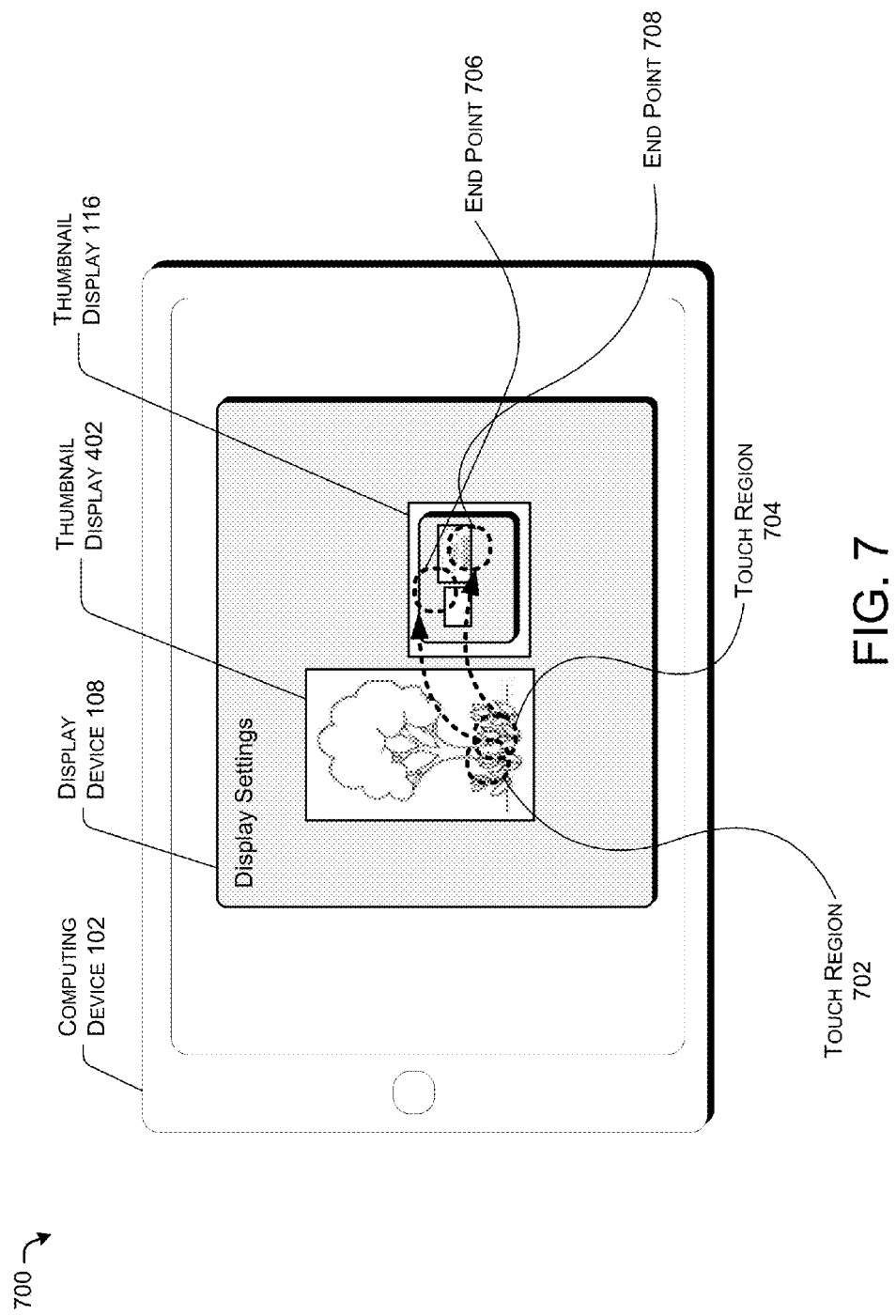
FIG. 7 illustrates a fourth example gesture for modifying a system setting according to some implementations.

FIG. 7 illustrates a framework 700 depicting the computing device 102, including a depiction of thumbnail displays 402 and 116, where the thumbnail 402 corresponds to display contents on one display, such as the external display 104 of FIG. 1, and the thumbnail display 116 corresponds to content shown on another display device, such as the device display 108. In some implementations, the gesture configuration component 118 of FIG. 1 may recognize a gesture as a gesture serving to duplicate monitors such that different display devices show the same content. For example, a user may use two fingers to simultaneously touch down proximate to the thumbnail display 402, such as touch regions 702 and 704, and then drag touch points within touch regions 702 and 704 to end points of the gesture in a region of the thumbnail display 116, such as end points 706 and 708. The gesture configuration component 118 of FIG. 1 may then respond by creating a duplicated monitor situation, where both display devices associated with the thumbnail displays 116, 402 show the same content. In some cases, the display device that includes the content being duplicated is the display device corresponding to the thumbnail display that is dragged on top of another thumbnail display. In the illustrative example of FIG. 7, the content of the display device being duplicated may correspond to the content of the display device associated with the thumbnail display 402. In another example, the content of the duplicated display device may include content of a display device in a higher hierarchical position, where the hierarchical position is set by the gesture configuration component 118 of FIG. 1 or by a user of the computing device 102. To illustrate, a first display device may be in a higher hierarchical position than a second display device when the first display device is opened before the second display device. Further, a first display device may be in a higher hierarchical position than a second display device based, at least in part, on the first display device being associated with a first computing device and the second display device being associated with a second computing device or being external to the first computing device.

Although several gestures have been described previously to cause changes to control settings, other gestures can also be implemented in embodiments described herein. In one example, to split duplicate monitors, the gesture configuration component 118 of FIG. 1 may detect a gesture where a user places two fingers over and proximate to a display thumbnail, and then spreads the two fingers apart to produce distinct display screens. In another example, a gesture may be defined to change the brightness of a display corresponding to a thumbnail display. For example, a gesture may be specified as two fingers touching down proximate to a thumbnail display, and if the user moves the two fingers upward, then a brightness for the corresponding display device may be increased. Similarly, in this example, if the two fingers are moved downward, then a brightness for the corresponding display device may be decreased. In still other examples, gestures may be specified to adjust other system settings, for example, contrast or color saturation levels.

Figure 8:
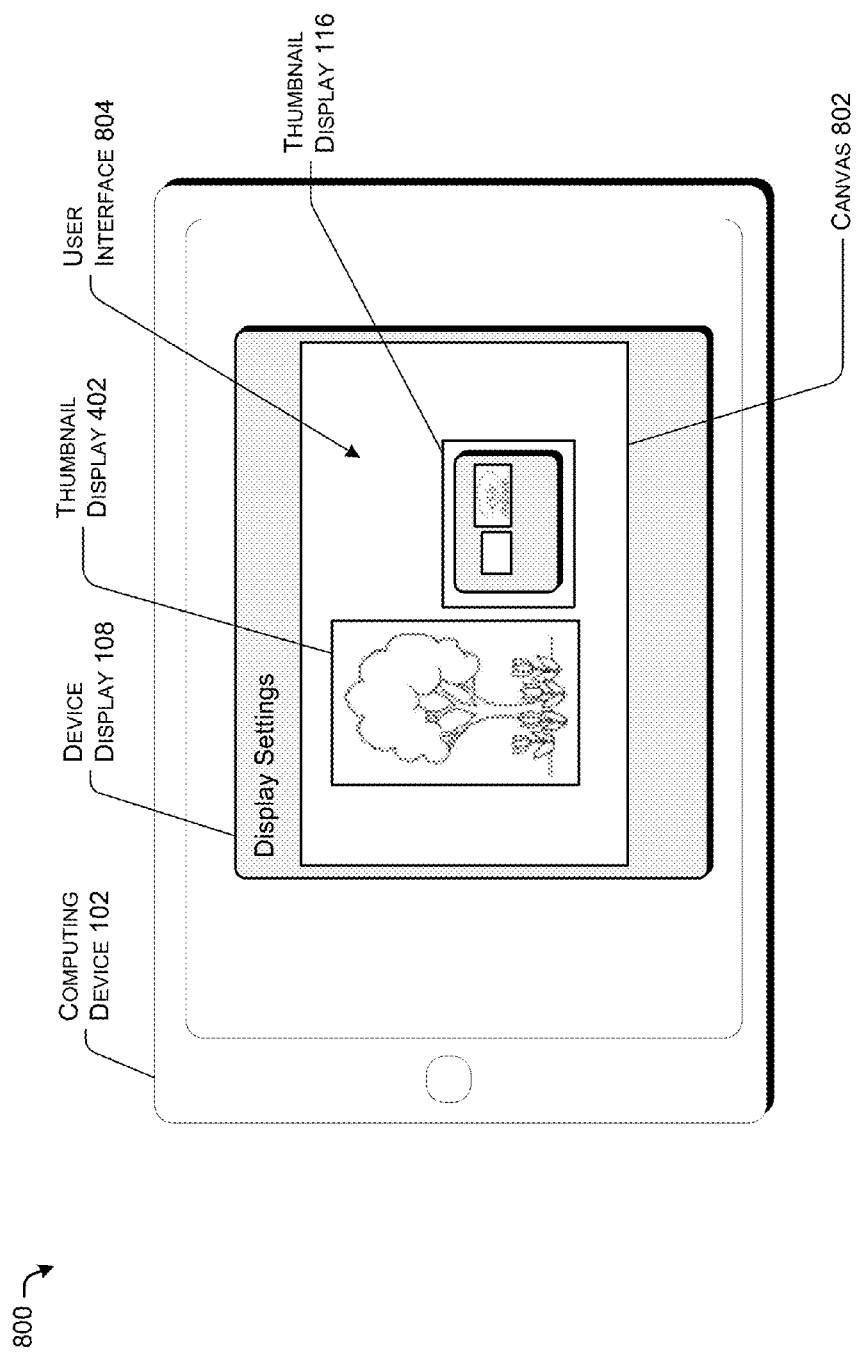
FIG. 8 illustrates an example of spacing of thumbnail displays in a user interface according to some implementations.

FIG. 8 illustrates a framework 800 depicting the computing device 102, including a depiction of thumbnails displays within a canvas 802 of a user interface 804 shown on the device display 108. In some implementations, the spacing of thumbnail displays may be specified to be visually appealing to a user. In other words, the layout of thumbnail displays within the user interface 804 may provide a more efficient workspace for users if the layout is appealing and not cluttered with a number of icons and/or buttons that are selectable to perform various functions. As illustrated, within the device display 108, there may be a region of the user interface 804 within which thumbnail displays are depicted. This region may be referred to as a canvas, such as the canvas 802, which is further described with respect to FIG. 9.

Figure 9:
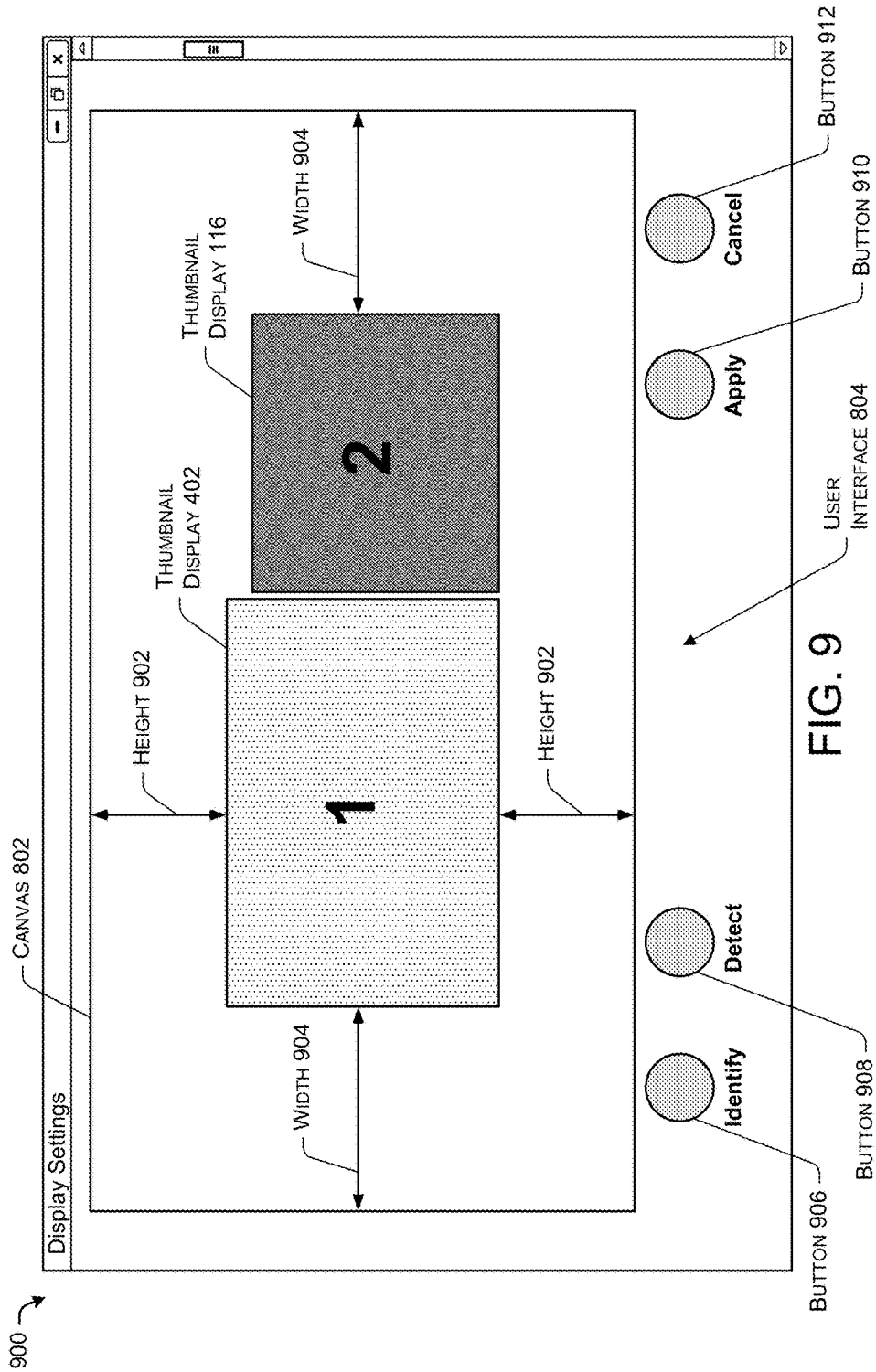
FIG. 9 illustrates a continuation of the example of spacing of thumbnail displays in a user interface according to some implementations.

FIG. 9 illustrates a framework 900 including a more detailed view of the canvas 802 introduced in FIG. 8. For example, the canvas 802 may include a height 902 that represents the distance between a top edge of the thumbnail display that is positioned closest to the top edge of the canvas 802 (thumbnail display 402 in the illustrative example of FIG. 9) and the top edge of the canvas 802. In some implementations, the height 902 may be specified to be one half of the height of the thumbnail display with the largest height. In other implementations, the height 902 may also be specified to be the distance between the bottom edge of the thumbnail display that is closest to the bottom edge of the canvas 802 (thumbnail display 402 in the illustrative example of FIG. 9) and the bottom of canvas 802. In other implementations, the height 902 may be specified according to other parameters relative to or independent of the dimensions of the thumbnail displays within the canvas 802. In some implementations, a width 904 may be specified to be the distance between the rightmost thumbnail display edge and the rightmost edge of canvas 802. Additionally, the width 904 may be specified to be one half of the width of the largest thumbnail display, and/or the width 904 may also be specified to be the distance between the leftmost thumbnail display edge and the leftmost edge of the canvas 802. As noted above, in other examples, different visual layout parameters may be used. Further, in this example, the user interface 804 may include buttons used in configuring system settings, such as a button 906 that allows a user to identify a display device corresponding to a selected thumbnail display, a button 908 that allows a user to detect connected display devices, a button 910 that allows a user to apply any current modifications to display settings, and a button 912 that allows a user to cancel any current modifications to display settings.

Figure 10:
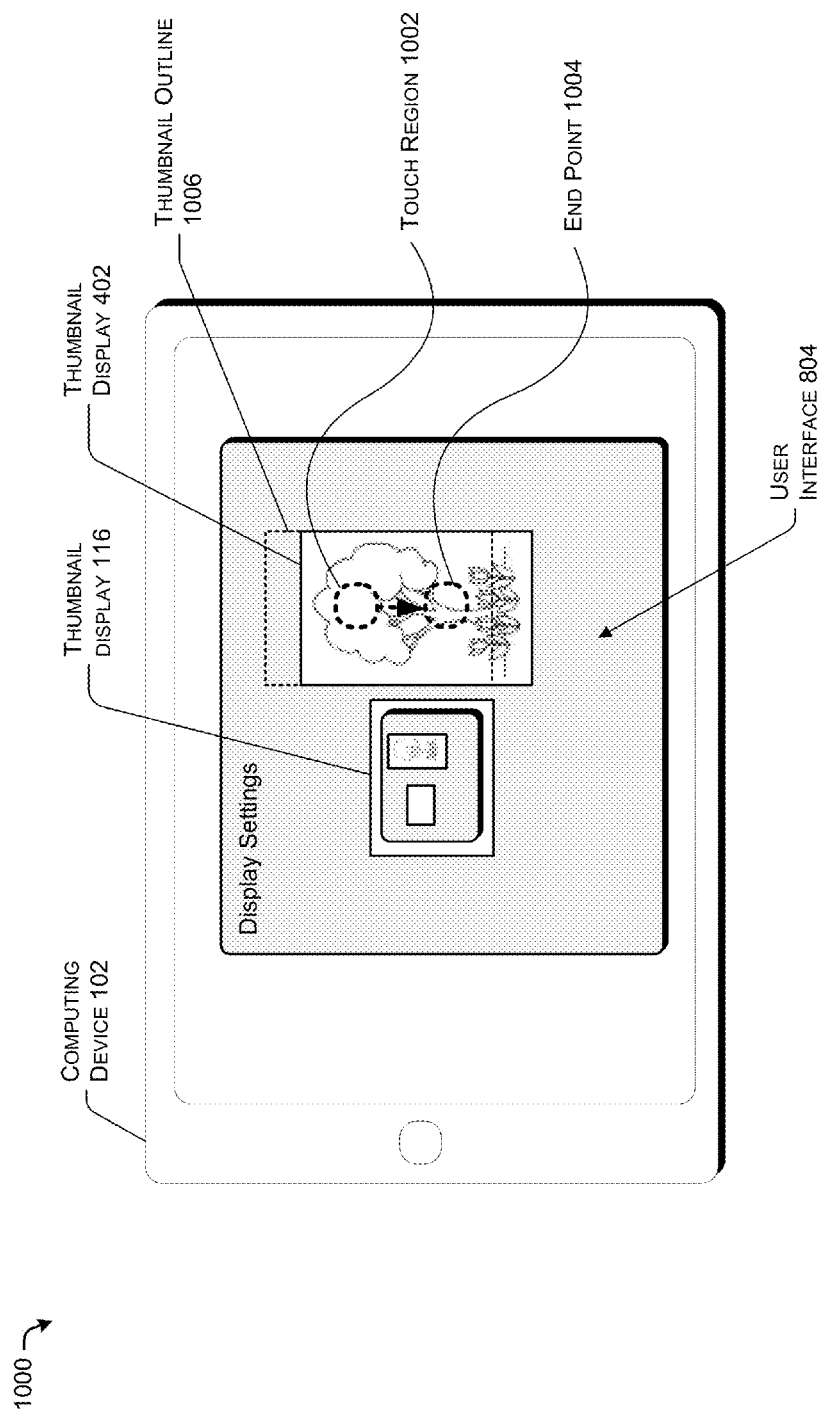
FIG. 10 illustrates a first example of gesture assistance features according to some implementations.

FIG. 10 illustrates a framework 1000 depicting the computing device 102, including a depiction of thumbnail displays within a user interface 804 of a settings control application, such as the settings control application 112 of FIG. 1. In some implementations, a user may rearrange the relative positioning of content of the user interface 804 through a touch and drag gesture. For example, given the two thumbnail displays 116 and 402 within the user interface 804, a user may touch down nearby or proximate to the thumbnail display 402, such as at a point within touch region 1002, and drag the thumbnail display 402 toward end point 1004. In this case, at the end of the gesture, the content of the respective display device corresponding to the thumbnail display 112 and the thumbnail display 402 are reoriented with respect to each other in a manner corresponding to the new positions represented with the displayed positions of the thumbnail display 116 and the thumbnail display 402. In this example, thumbnail outline 1006 represents the position of the thumbnail display 402 prior to the beginning of the move gesture.

In some implementations, the user may perform a touch and drag gesture to align any display thumbnails relative to each other in any configuration. For example, the user may align top edges of thumbnail displays relative to each other in a horizontal layout using a touch and drag gesture. To illustrate, a user may horizontally align a top edge of the thumbnail display 116 with a top edge of the thumbnail display 402. In another example, the user may align bottom edges of thumbnail displays relative to each other in a horizontal layout using a touch and drag gesture. To illustrate, a user may horizontally align a bottom edge of the thumbnail display 116 with a bottom edge of the thumbnail display 402. In an additional example, the user may left align thumbnail displays for a vertical layout using a touch and drag gesture, such that a left edge of a first thumbnail display and a left edge of a second thumbnail display are aligned vertically. In a further example, the user may right align displays for a vertical layout using a touch and drag gesture, such that a right edge of a first thumbnail display and a right edge of a second thumbnail display are aligned vertically.

In some implementations, as a user drags a thumbnail display into a new position or relative orientation, there may be a sticky region or snap region to compensate for gestures that are shaky or not precise. For example, in some cases, touch input may be less precise than input from a pointer device, such as a mouse. The gesture configuration component 118 of FIG. 1 may provide several different gesture assistance features for accommodating touch input that may be inexact, as discussed below with respect to FIGS. 11 and 12.

Figure 11:
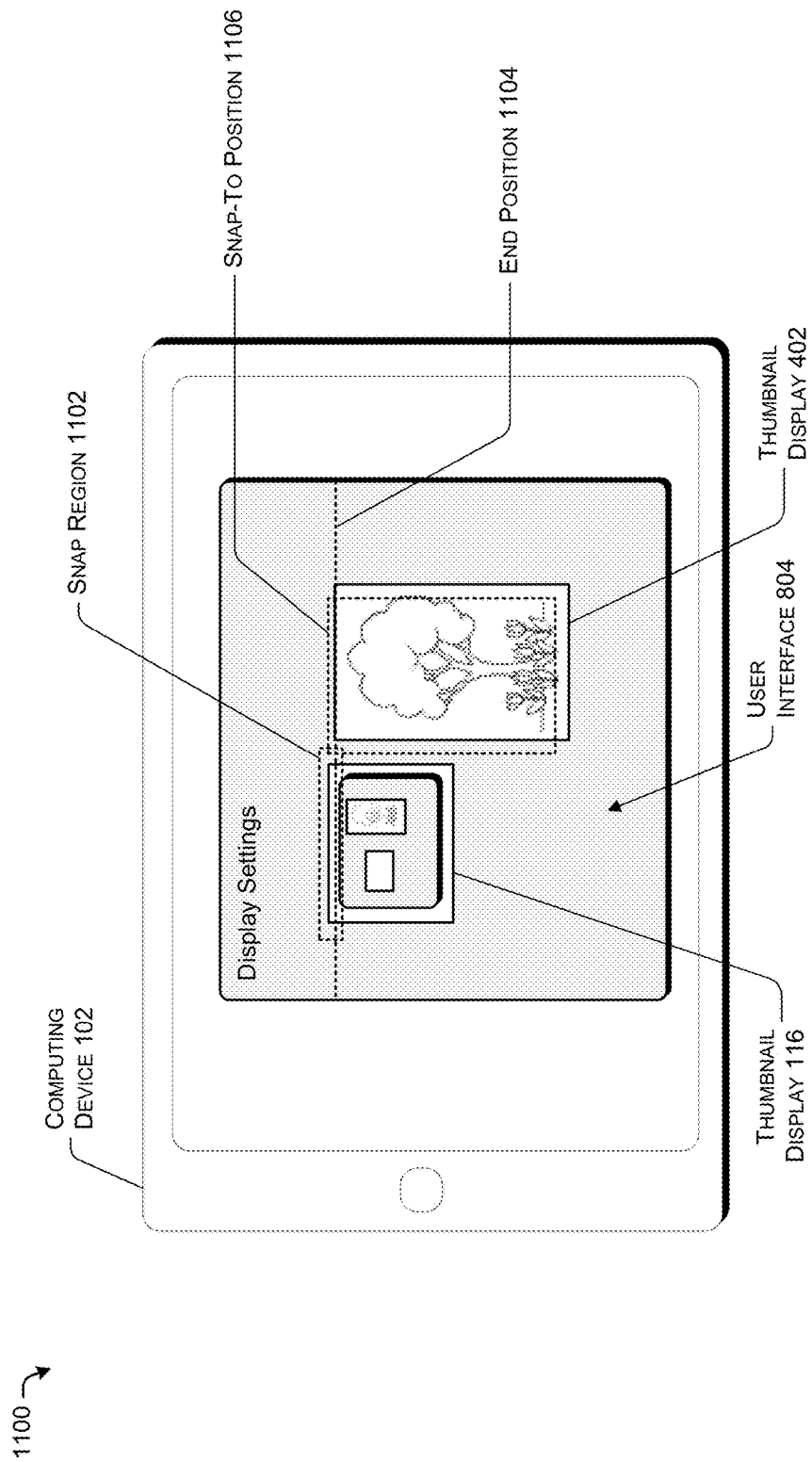
FIG. 11 illustrates a second example of gesture assistance features according to some implementations.

FIG. 11 illustrates a framework 1100 depicting the computing device 102, including a depiction of thumbnail displays within a user interface 804 of a settings control application. In this implementation, a snap region 1102 may be a sticky region or snap region around an edge of a thumbnail display, or around each edge of a thumbnail display. In an example, when a gesture ends with a top edge of the thumbnail display 402 being dragged within snap region 1102, the thumbnail display 402 is snapped or placed into alignment with the top of the thumbnail display 116. In this example, the thumbnail display 402 may be snapped from end position 1104 into snap-to position 1106. In some implementations, the snap region 1102 may be specified in terms of pixels, for example, five or ten or a different number of pixels surrounding an edge, or an area of pixels, such as 5×8 pixels or 2×10 pixels. In some implementations, depending on how rough a gesture a user may like to accommodate, a particular snap region may be specified to be different sizes in response to input from the user.

Figure 12:
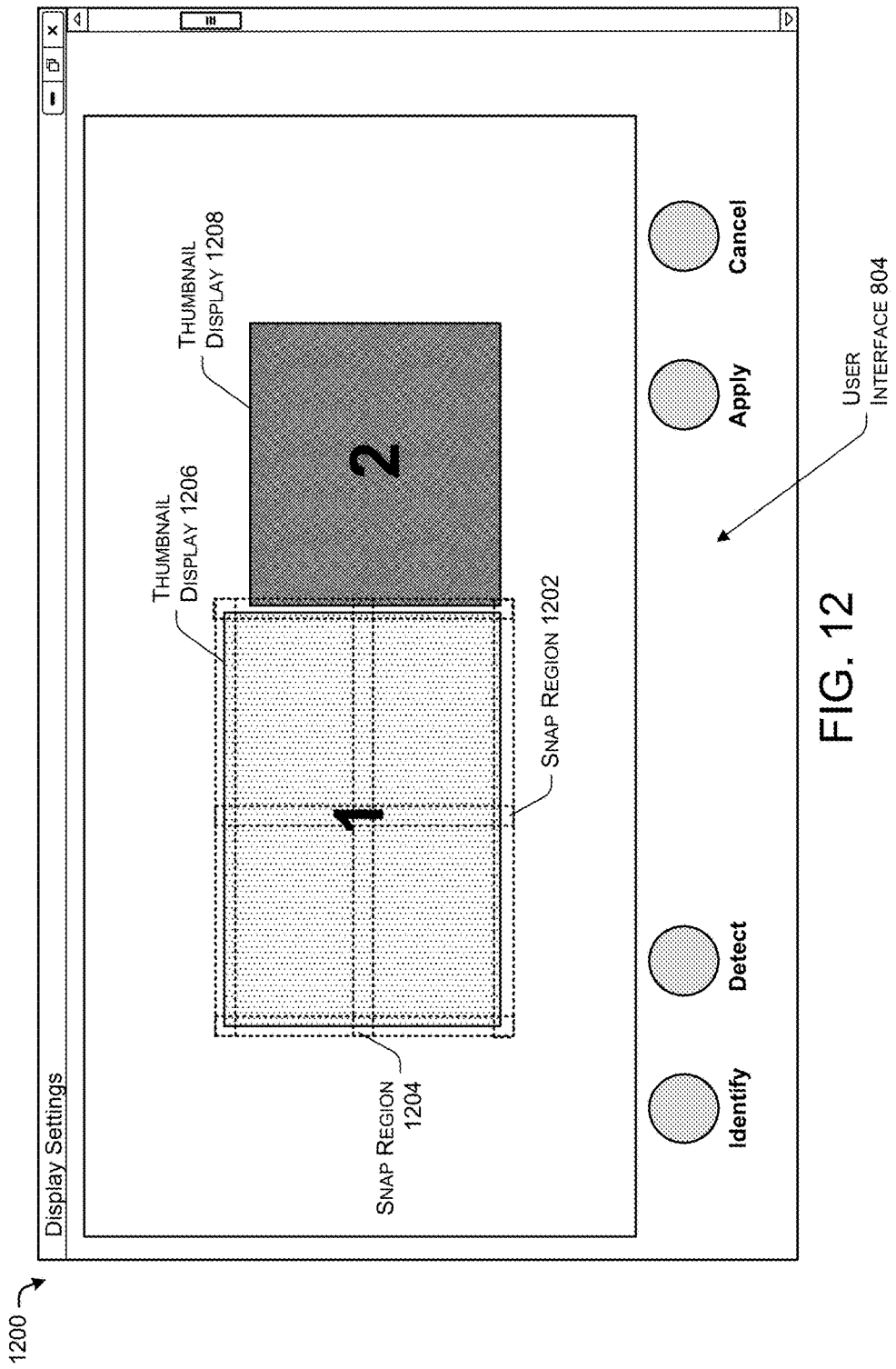
FIG. 12 illustrates a third example of gesture assistance features according to some implementations.

FIG. 12 illustrates a framework 1200 depicting the device 102, including a depiction of thumbnail displays within a user interface 804 of a settings control application. As discussed above with respect to FIG. 10, a given thumbnail display may specify a snap region along edges of the given thumbnail display. Further, as depicted in FIG. 12, snap regions may be located with respect to other portions of a thumbnail display. For example, a snap region 1202 and a snap region 1204 may be associated with a thumbnail display 1206. In these cases, the snap region 1202 may include a region surrounding a center vertical axis of the thumbnail display 1206 and the snap region 1204 may include a region surrounding a center horizontal axis of the thumbnail display 1206. Further, one or more snap regions may be specified for additional thumbnail displays, such as thumbnail display 1208, which for clarity, are not illustrated.

Figure 13:
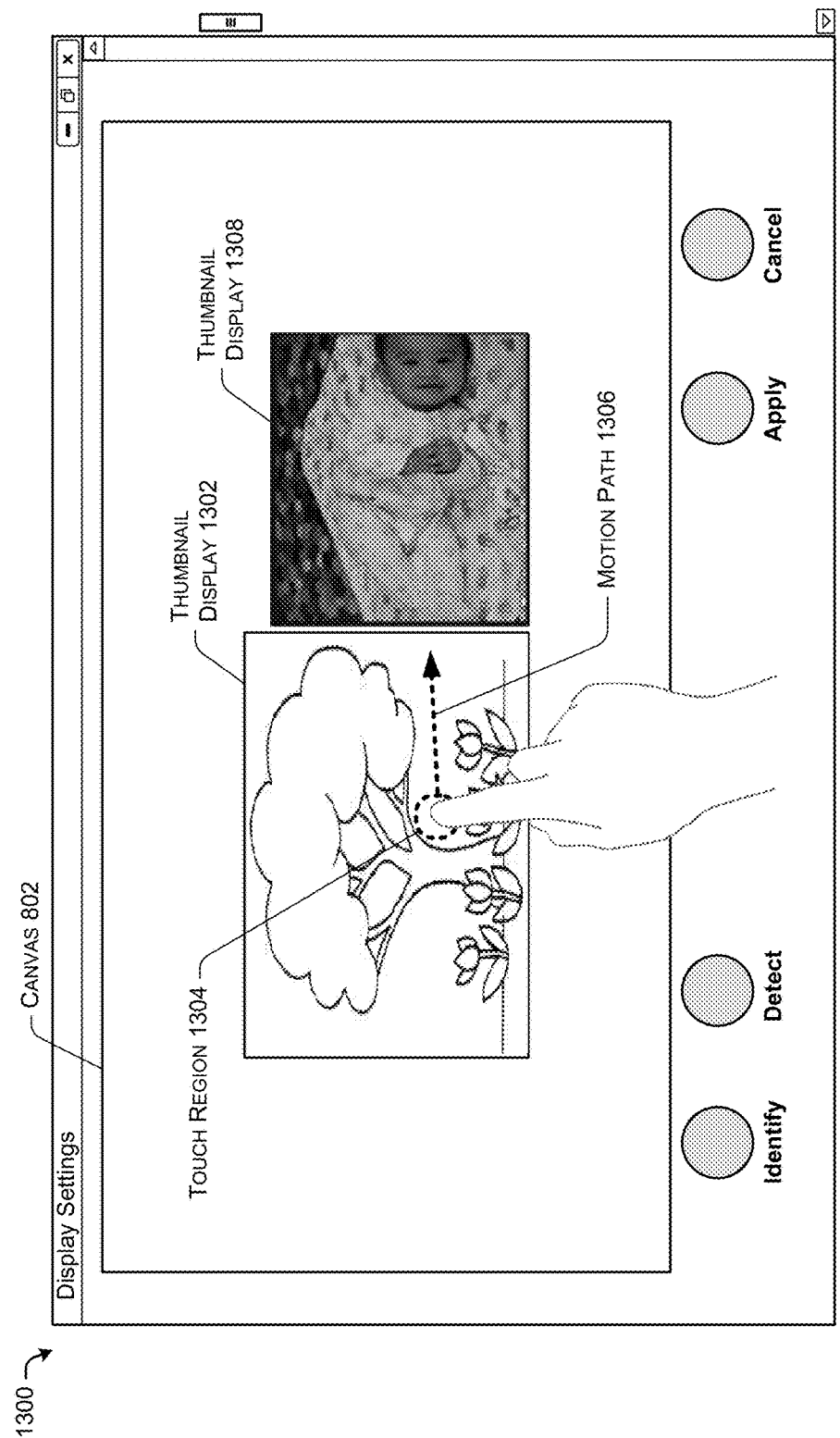
FIG. 13 illustrates an example of a live preview during a drag gesture of a thumbnail display according to some implementations.
Figure 14:
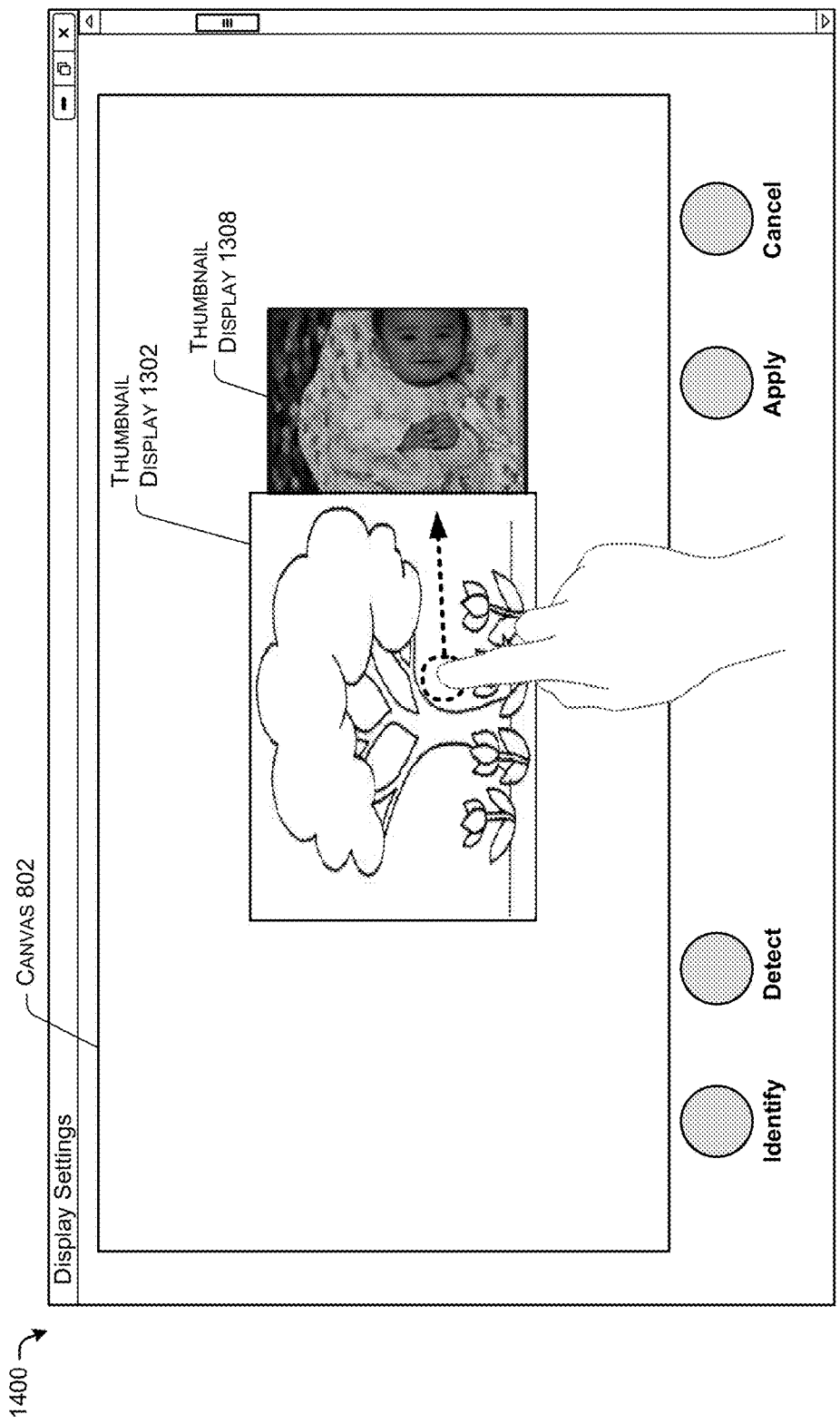
FIG. 14 illustrates a continuation of the example of the live preview during a drag gesture of a thumbnail display according to some implementations.
Figure 15:
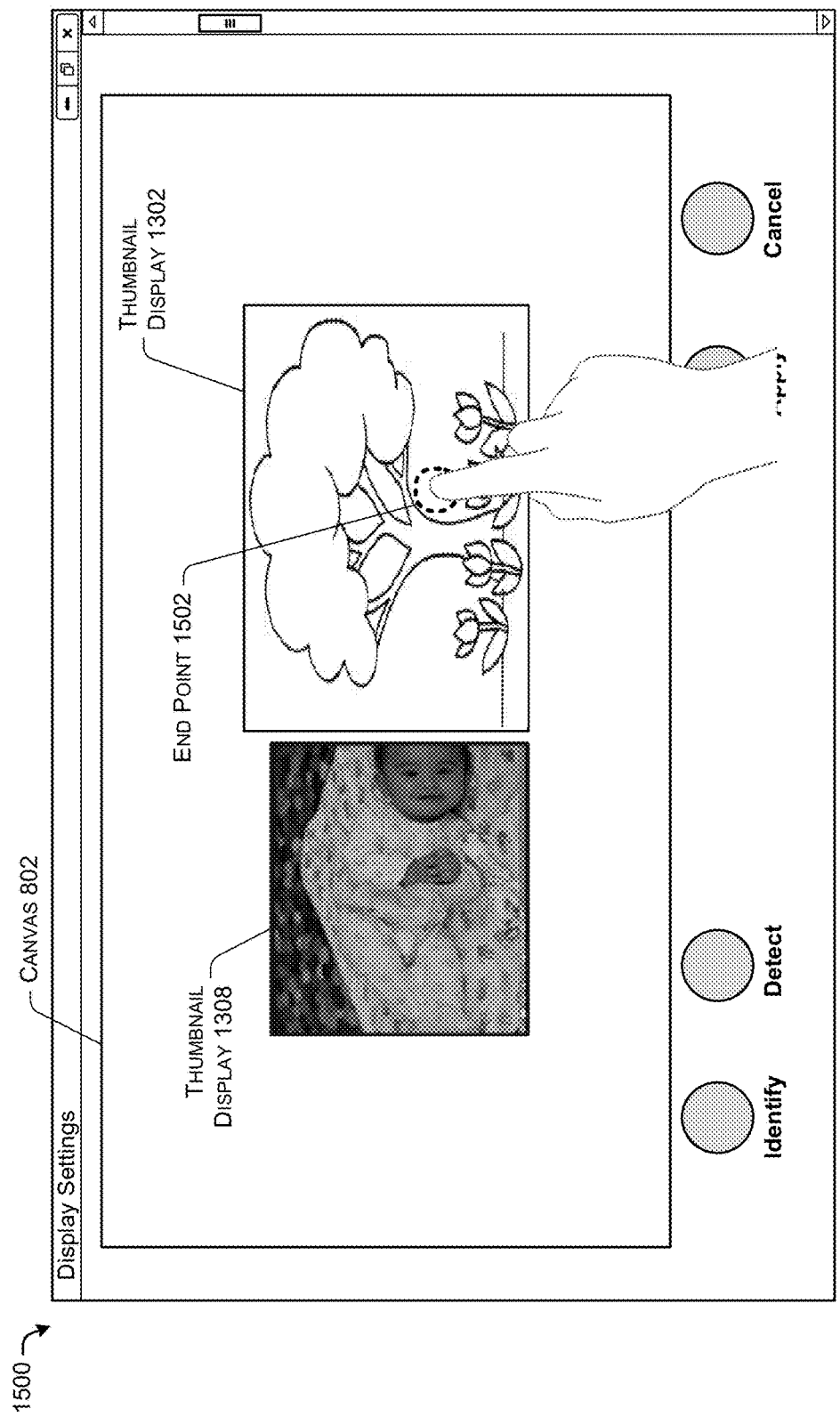
FIG. 15 illustrates a continuation of the example of the live preview during a drag gesture of a thumbnail display according to some implementations.

FIGS. 13, 14 and 15 illustrate frameworks 1300, 1400 and 1500, depicting the computing device 102 and a sequence of relative thumbnail display positions corresponding to a move gesture to reposition thumbnail displays with respect to each other. In this implementation, a live preview of content of a display device is provided to a user via a thumbnail display 1302 as the thumbnail display 1302 is manipulated by one or more gestures. For example, instead of simply presenting the thumbnail display 1302 with an identification value (e.g., a number one or a number two), the thumbnail display 1302 may include a live preview, which may include a scaled down version of the content being shown on a display device corresponding to the thumbnail display 1302. In the illustrative example of FIG. 13, a user may touch a point within touch region 1304, and begin a move gesture in the direction of motion path 1306, toward thumbnail display 1308.

FIG. 14 illustrates a continuation of the move gesture described with respect to FIG. 13. As illustrated, the content of the thumbnail display 1308 are obscured as the thumbnail display 1302 is dragged over the thumbnail display 1308, and the content of the thumbnail display 1302 is maintained as a live preview during the gesture.

FIG. 15 illustrates a new arrangement of thumbnail displays in response to a conclusion of the move gesture with respect to the thumbnail display 1302 and the thumbnail display 1308. In this example, a user may conclude the move gesture when the user lifts a finger from the canvas 802 at end point 1502. Further, in this example, the thumbnail display 1308 may be snapped into the position formerly occupied with thumbnail display 1302 when the user concluded the move gesture with thumbnail display 1302 over thumbnail display 1308.

Figure 16:
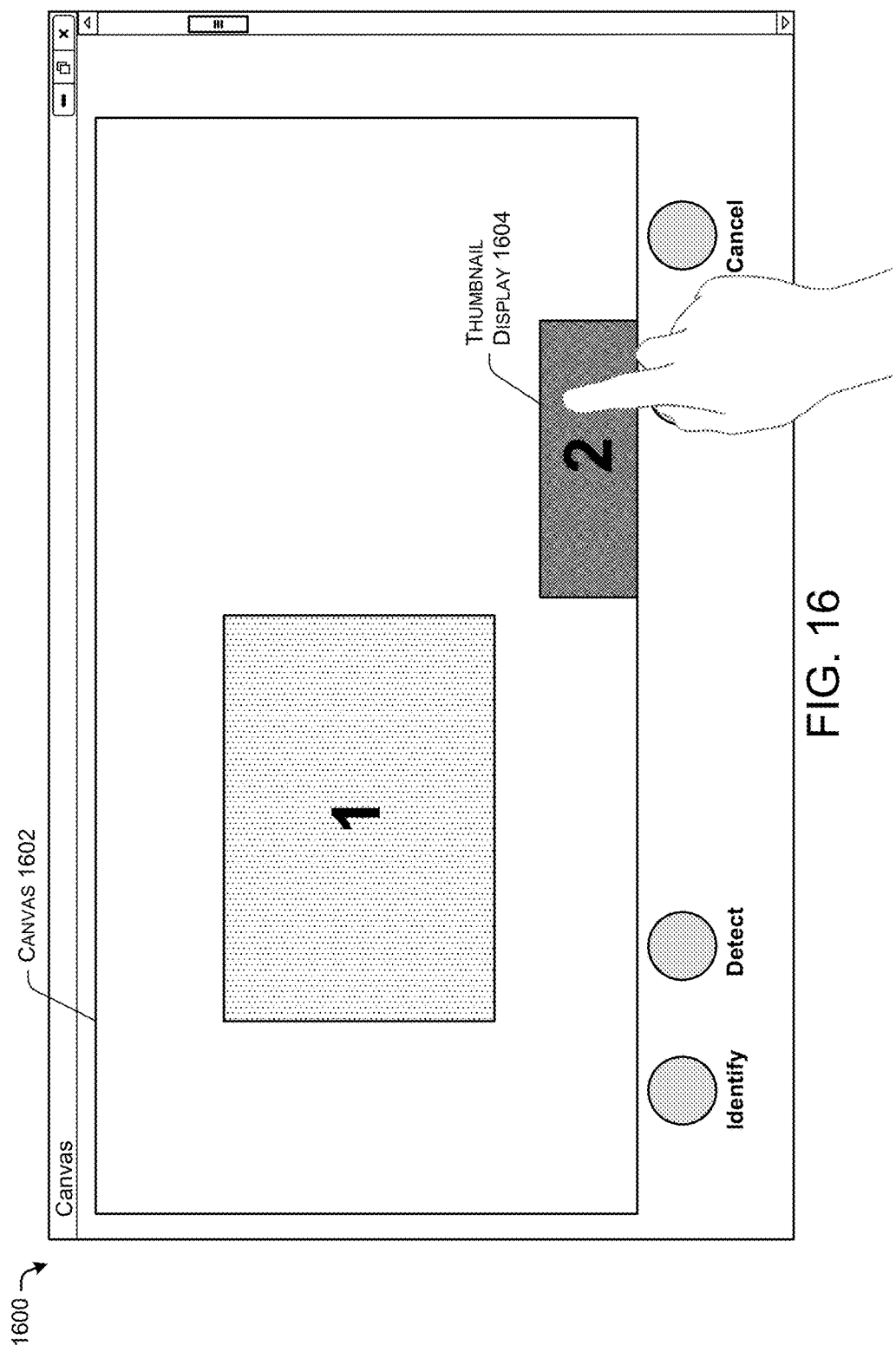
FIG. 16 illustrates layout configuration restrictions imposed by a gesture configuration component according to some implementations.

FIG. 16 illustrates a framework 1600 depicting the computing device 102, including a depiction of thumbnail displays within a canvas 1602 of a settings control application. In some implementations, a user, the gesture configuration component 118 of FIG. 1, or both may impose restrictions on the movements of a gesture. For example, in regard to a drag and drop of display thumbnails, the gesture configuration component 118 may restrict dragging a thumbnail display off of the canvas. The illustrative example of FIG. 16 illustrates a limit of how far a display thumbnail, such as the display thumbnail 1604, may be moved off the canvas 1602 of a settings control application. Further, as illustrated, the information of the thumbnail display 1604 may be modified to continue to provide useful information. To illustrate, in the illustrative example of FIG. 16, the number "2" identifying the thumbnail display 1604, is not displayed in the center of the thumbnail display 1604 where it may not be visible or where it may not convey useful information, but rather the number "2" is displayed in the area of the thumbnail display 1604 that is still visible within the canvas 1602.

In some implementations, in order to prevent a specified amount of the thumbnail display 1604 from becoming obscured, the vertical movement of the thumbnail display 1604 may be restricted when more than ⅔ of the height of the thumbnail display 1604 is outside of the canvas 1602. Similarly, the horizontal movement of the thumbnail display 1604 may be restricted when more than ⅔ of the width of the thumbnail display 1604 is outside of the canvas 1602. In other examples, different values or thresholds may be specified to maintain a consistent and useful user interface.

In some implementations, with respect to maintaining a useful and consistent user interface experience, in order to minimize or reduce dead areas for page panning, some rules or guidelines may be enforced so that users may both drag thumbnail displays to rearrange monitors and still be able to pan a user interface of a settings control application. For example, the rules or guidelines may include: (1) if a user touches on a thumbnail display, the touch may be interpreted as selection of the thumbnail display, allowing a user to subsequently drag the thumbnail display to a new position, and (2) if a user touches on an empty area within the canvas of a user interface of a settings control application, the touch may be interpreted as page panning.

In an implementation, if a canvas of a user interface of a settings control application includes 12 thumbnail displays, and only 8 fit within a canvas, then if a user touches an area of the canvas that does not have a thumbnail display, then a panning operation is performed, allowing the user to see at least some of the 12 thumbnail displays that are not currently being shown in the canvas. However, if a gesture begins with a touch over a region of a thumbnail display, the subsequent drag motion may be interpreted as a rearranging (or dragging) of the thumbnail display to a new position within the canvas.

In some implementations, a gesture may be modified with a mouse or keyboard input. For example, a user may begin a touch gesture over a given thumbnail display, and if the user holds the touch over the thumbnail display, a user may use the arrow keys, or some other specified keys, to move the thumbnail display. In other implementations, a user may touch and select a particular thumbnail display, and release the touch, leaving the thumbnail display selected, and then use the arrow keys to move the thumbnail display into a new position.

Figure 17:
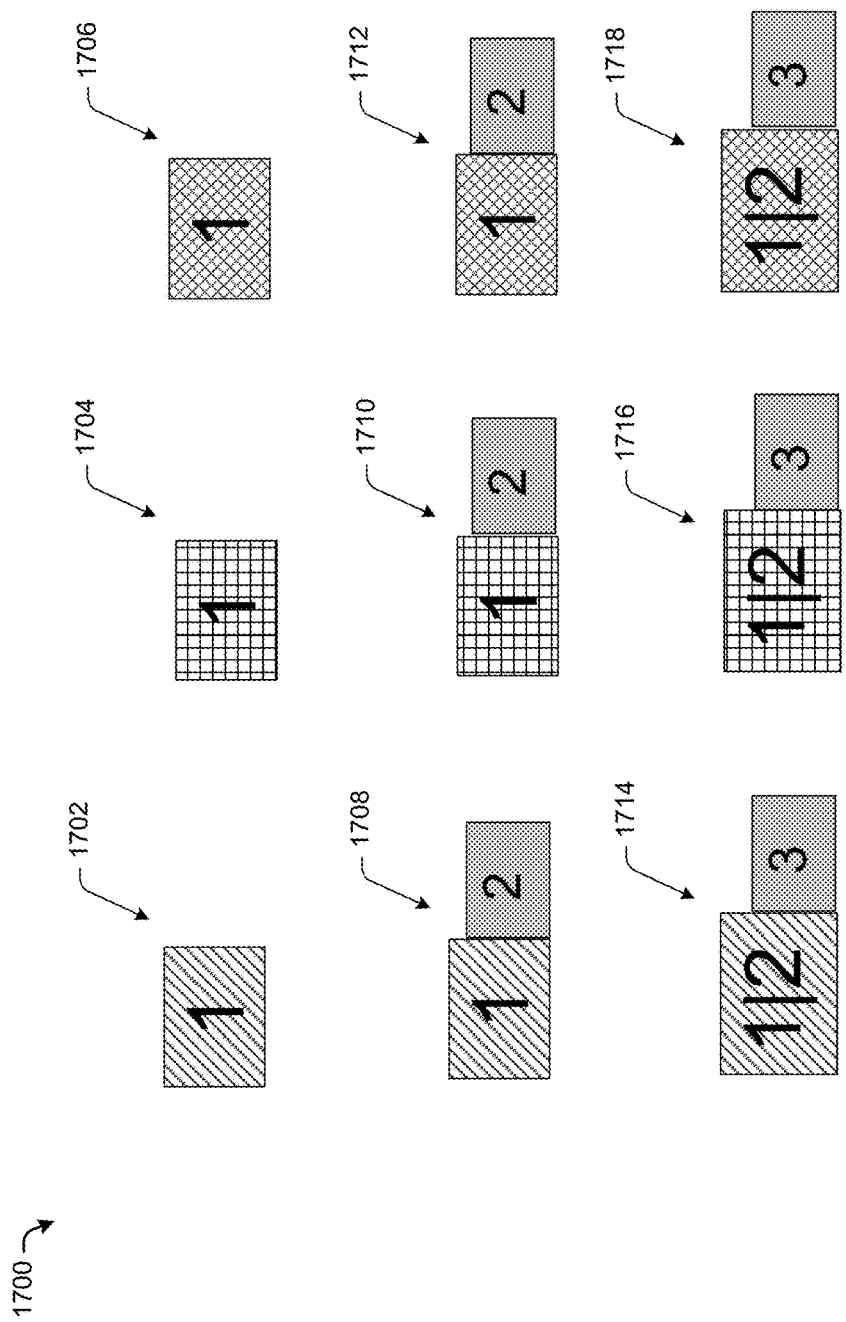
FIG. 17 illustrates a technique for using a user personalization in distinguishing between thumbnail displays according to some implementations.

FIG. 17 illustrates a framework 1700 depicting examples of using personalization information in specifying an appearance of thumbnail displays within a user interface of a settings control application. In some implementations, thumbnail displays may be drawn with particular colors, where the color selections are based at least partly on a user profile, user preferences, or user specifications. In this example, different thumbnail display colors, as indicated in FIG. 17 by the different pattern backgrounds, are used to differentiate the various thumbnail displays as they may be displayed within a user interface of a settings control application. For example, in some cases, without a live preview, the user may rely on personalized color settings that have been set, in order to identify each display device. Display configurations 1702-1718 depict various uses of using personalization information that may be used to differentiate the thumbnail displays of a settings control application. In some cases, when live previews may be used instead of a display identifier, a live preview may displayed within a thumbnail display that has a border color defined according to a user personalization, a user preference, or a user specification.

Figure 18:
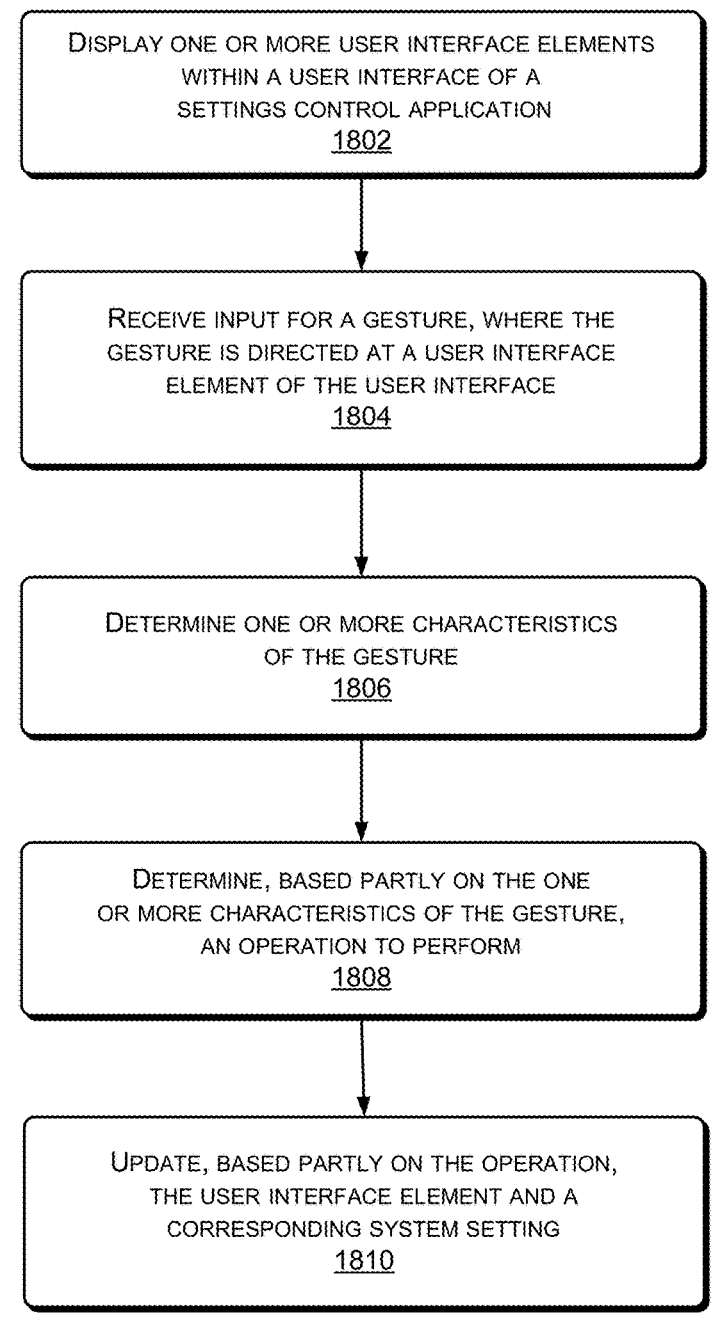
FIG. 18 illustrates an example method including some operations performed by a gesture configuration component, in accordance with some implementations.

FIG. 18 depicts a flowchart of a method 1800 including some of the features within an implementation of a gesture configuration component. As discussed above, a gesture configuration component, such as the gesture configuration component 118 of FIG. 1, may provide a gesture-based environment for a user to provide input regarding configuration changes to various applications or input regarding system settings to a settings control application.

As depicted in FIG. 1, a computing environment 100 may include the computing device 102, connected to the external display 104. In an implementation, the computing device 102 may include a touch-sensitive display device. The computing device 102 may be executing the settings control application 112 that provides the user interface 110. Further, the user interface 110 may include several user interface elements, such as the first thumbnail display 114 for the external display 104 and the second thumbnail display 116 for the device display 108. At 1802, the method 1800 includes displaying one or more user interface elements within the user interface 110 of the settings control application 112. In some cases, the user interface elements may include one or more representations of applications (e.g., an icon associated with an application) or representations of content of an application, and settings associated with the applications may be modified in response to gestures performed with respect to the user interface element of the application.

Given thumbnail displays 114, 116 shown in the user interface 110, a user may provide gesture input which may be received at the gesture configuration component 118 of FIG. 1. The gesture input may be directed to a user interface element—such that the gesture is not directed at a button and/or icon of a control setting or menu option, as depicted at 1804. In this example, a user may, using a gesture, touch the first thumbnail display 114 or the second thumbnail display 116, rather than a button or icon of a control setting or menu option. Additionally, in some cases, control settings for the thumbnail displays 114, 116 may be modified without displaying or manipulating a visible scale associated with a respective control setting. In these cases, the magnitude of the change of the control setting is associated with the magnitude of the gesture performed to modify the control setting.

Depending at least partly on the gesture characteristics (e.g., the movements associated with the gesture), the gesture configuration component 118 may determine a particular operation the user intends to perform, as depicted at 1806 and 1808.

After the gesture configuration component 118 has determined the operation corresponding to the gesture, the gesture configuration component 118 may carry out, or execute the operation. In other cases, the gesture configuration component 118 may invoke one or more other components of the device 102, such as an operating system, to execute the operation. Executing the operation may result in updating the visual presentation of the thumbnail displays 114, 116 as well as updating a system setting that corresponds to the gesture directed at the respective thumbnail displays 114, 116, as depicted at 1810. For example, if a user increases the resolution of the thumbnail display 114 using a gesture, the visual presentation of the thumbnail display 114 within the user interface 110 of the settings control application 112 is increased, and the resolution on the external display 104 is correspondingly increased. In some cases, the effect of the update may be achieved through the transmission to a system application programming interface in order for the operating system to carry out the operation corresponding to the gesture.

Illustrative Computing System

Figure 19:
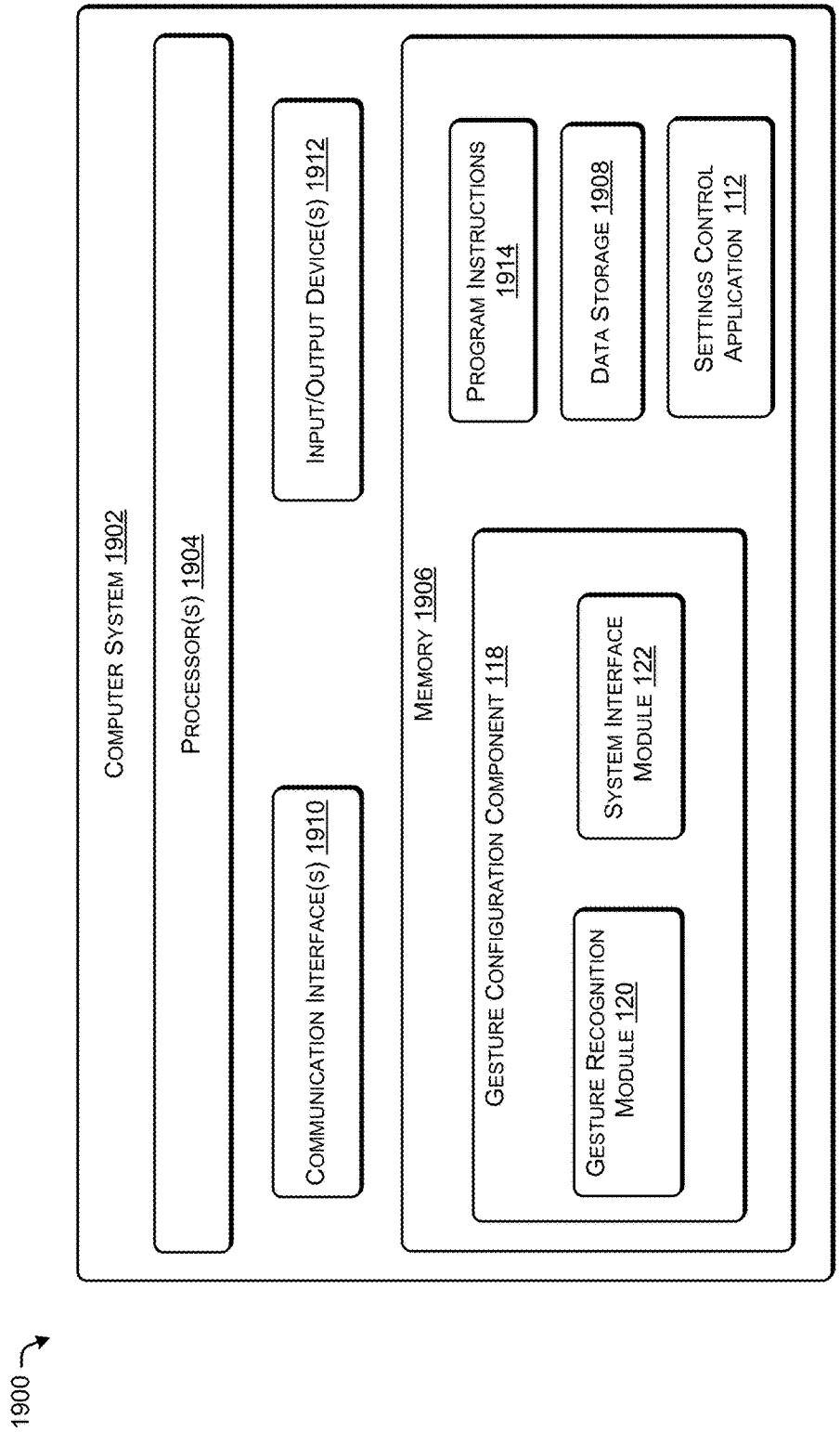
FIG. 19 illustrates a computer system for implementing a gesture configuration component in accordance with the implementations described herein.

FIG. 19 further illustrates a framework 1900 depicting a computer system 1902. Computer system 1902 may be implemented in different devices, such as computing device 102 depicted in FIG. 1. Generally, computer system 1902 may be implemented in any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in any type of computing or electronic device.

In one implementation, computer system 1902 includes one or more processors 1904 coupled to memory 1906. The processor(s) 1904 can be a single processing unit or a number of processing units, all of which can include single or multiple computing units or multiple cores. The processor(s) 1904 can be implemented as one or more microprocessors, microcomputers, microcontrollers, digital signal processors, central processing units, state machines, logic circuitries, and/or any devices that manipulate signals based on operational instructions. As one non-limiting example, the processor(s) 1904 may be one or more hardware processors and/or logic circuits of any suitable type specifically programmed or configured to execute the algorithms and processes described herein. Among other capabilities, the processor(s) 1904 can be configured to fetch and execute computer-readable instructions stored in the memory 1906 or other computer-readable media. Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

By contrast, communication media may embody computer-readable instructions, data structures, program modules, or other data in a modulated data signal, such as a carrier wave, or other transmission mechanism. As defined herein, computer storage media does not include communication media.

The memory 1906, including data storage 1908, is an example of computer storage media. Further, computer system 1902 may include one or more communication interfaces 1910 that may facilitate communications between computing devices. In particular, the communication interfaces 1910 may include one or more wired network communication interfaces, one or more wireless communication interfaces, or both, to facilitate communication via one or more networks represented by a network, such as network 106 of FIG. 1. The network 106 may be representative of any one or combination of multiple different types of wired and wireless networks, such as the Internet, cable networks, satellite networks, wide area wireless communication networks, wired local area networks, wireless local area networks, public switched telephone networks (PSTN), and the like.

Additionally, computer system 1902 may include input/output devices 1912. The input/output devices 1912 may include a keyboard, a pointer device, (e.g. a mouse or a stylus), a touch screen, one or more image capture devices (e.g. one or more cameras), one or more microphones, a display, speakers, and so forth.

In some implementations, the invention may be implemented using a single instance of a computer system, while in other implementations, the invention may be implemented on multiple such systems, or multiple nodes making up a computer system may be configured to host different portions or instances of implementations. For example, in one implementation some elements may be implemented via one or more nodes of the computer system that are distinct from those nodes implementing other elements.

The memory 1906 within the computer system 1902 may include program instructions 1914 configured to implement each of the implementations described herein. In one implementation, the program instructions may include software elements of implementations of the modules and components discussed herein, such as the display settings control application 112, the gesture configuration component 118, the gesture recognition module 120, and the system interface module 122. The data storage 1908 within the computer system 1902 may include data that may be used in other implementations.

Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
one or more processors; and
memory storing computer-readable instructions that, when executed by the one or more processors, cause the one or more processors to perform operations comprising:
receiving an indication of a gesture input applied to a first thumbnail corresponding to a first screen of a first display device;
modifying a system setting associated with the first screen to a threshold value associated with a display setting of the first screen;
responsive to recognizing that the gesture input is maintained for a threshold period of time, selecting a second screen of a second display device for modification, the second display device being different from the first display device, and
modifying a system setting associated with the second screen to the threshold value associated with the display setting of the first screen.

2. The system as recited in claim 1, wherein recognizing that the gesture is maintained includes at least one of:
receiving an indication that a point is substantially continuously touched on a touch sensitive display after receiving the indication of the gesture input being applied; or
recognizing that the gesture is maintained for the threshold period of time.

3. The system as recited in claim 1, wherein the selecting occurs without receiving user input indicating selection of the second screen.

4. The system as recited in claim 1, further comprising modifying the system setting with respect to the second screen.

5. A method comprising:
performing, by one or more computing devices:
displaying a user interface element including at least one thumbnail display of a plurality of thumbnail displays associated with a respective display device within a user interface of a control settings application, the at least one thumbnail display of the plurality of thumbnail displays displaying content of the respective display device;
receiving an input for a gesture directed at the user interface element;
determining, based partly on the gesture, an operation to perform; and
updating, based partly on performing the operation, the user interface element, the respective display device, and a system setting corresponding to the user interface element;
receiving another input indicating a repeat of the gesture to perform the operation;
determining that the at least one thumbnail display of the plurality of thumbnail displays has reached a maximum update limit; and
in response to determining that the at least thumbnail display of the plurality of thumbnail displays has reached the maximum update limit:
selecting an additional thumbnail display from among the plurality of thumbnail displays, and
updating, based on performing the operation, the additional thumbnail display.

6. The method as recited in claim 5, further comprising:
identifying a remote device associated with the operation; and
transmitting an update to one or more system characteristics of the remote device according to the operation.

7. The method as recited in claim 5, wherein the user interface element of the user interface does not include visible control settings.

8. The method as recited in claim 5, wherein the control settings application controls display settings for one or more display devices.

9. The method as recited in claim 5, wherein the gesture corresponds to a modification of one or more of display resolution, display orientation, or display order.

10. The method as recited in claim 5, wherein the user interface element further comprises a thumbnail display of live content shown on the respective display device.

11. The method as recited in claim 5, further comprising:
in response to determining that the operation being performed is a drag operation, dragging the at least one thumbnail display to a different location of the user interface in accordance with the gesture.

12. The method as recited in claim 11, wherein the at least one thumbnail display displays live content shown on the respective display device, and wherein the live content shown on the respective display device is depicted in the at least one thumbnail display for a duration of the drag operation.

13. The method as recited in claim 5, wherein the gesture corresponds to a tactile gesture including a motion path detected on a touch-sensitive device, the motion path defined by pixels touched between a starting touch region and an ending touch region during the input for the gesture.

14. The method as recited in claim 5, wherein the gesture is detected visually with one or more cameras.

15. The method as recited in claim 5, wherein the at least one thumbnail display displays live content of the respective display device.

16. The method as recited in claim 5, further comprising:
when a currently selected thumbnail display reaches the maximum update limit, selecting, without user input indicating selection of any particular thumbnail display, another thumbnail display from among the plurality of thumbnail displays until each thumbnail display of the plurality of thumbnail displays has been selected.

17. The method as recited in claim 5, wherein selecting the additional thumbnail display in response to determining that the thumbnail display has reached the maximum update limit is performed without user input indicating selection of the additional thumbnail display.

18. One or more computer-readable storage devices storing computer-executable instructions that, when executed by one or more processors, cause the one or more processors to perform operations comprising:
receiving an indication of a gesture input applied to a first thumbnail corresponding to a first screen of a first display device;
modifying a system setting associated with the first screen to a threshold value associated with a display setting or an audio setting of the first screen;
responsive to the gesture input being maintained for a threshold period of time, selecting a second screen of a second display device for modification, the second display device being different from the first display device, and modifying a system setting associated with the second screen to the threshold value associated with the display setting of the first screen.

19. The one or more computer-readable storage devices as recited in claim 18, wherein the first thumbnail shows content of the first screen, and modifying the system setting associated with the first screen includes at least one of:
changing an orientation of the content of the first screen;
changing a resolution of the first screen;
changing a size of the first thumbnail;
changing a position of the first thumbnail;
duplicating the content of the first screen on an additional screen;
splitting a duplicated screen;
changing a brightness of the first screen;
changing a contrast of the first screen;
changing a color saturation level of the first screen;
adjusting the audio setting associated with the first screen;
identifying the first screen; and
reorienting the first screen with respect to the additional screen.

20. The one or more computer-readable storage devices as recited in claim 18, the operations further comprising modifying the system setting with respect to the second screen.

* * * * *